US012205567B1

(12) United States Patent
Shapiro

(10) Patent No.: US 12,205,567 B1
(45) Date of Patent: Jan. 21, 2025

(54) ARPEGGIATOR MUSICAL INSTRUMENT

(71) Applicant: Chord Board, LLC, Old Bethpage, NY (US)

(72) Inventor: Akiva Shapiro, Old Bethpage, NY (US)

(73) Assignee: Chord Board, LLC, Old Bethpage, NY (US)

( * ) Notice: Subject to any disclaimer, the term of this patent is extended or adjusted under 35 U.S.C. 154(b) by 0 days.

(21) Appl. No.: 18/666,090

(22) Filed: May 16, 2024

Related U.S. Application Data

(60) Provisional application No. 63/618,113, filed on Jan. 5, 2024.

(51) Int. Cl.
*G10H 1/28* (2006.01)
*G10H 1/00* (2006.01)

(52) U.S. Cl.
CPC ............. *G10H 1/28* (2013.01); *G10H 1/0008* (2013.01); *G10H 2210/185* (2013.01); *G10H 2220/161* (2013.01); *G10H 2220/201* (2013.01)

(58) Field of Classification Search
CPC .. G10H 1/28; G10H 1/0008; G10H 2210/185; G10H 2220/161; G10H 2220/201
USPC ............................................................. 84/609
See application file for complete search history.

(56) References Cited

U.S. PATENT DOCUMENTS 6,066,794 A * 5/2000 Longo .................... G10H 5/007 84/645
10,269,335 B1 4/2019 O'Hair et al.
11,842,709 B1 * 12/2023 Shapiro ................ G10H 1/0066
2002/0015064 A1 * 2/2002 Robotham .......... G06F 3/04883 715/863
2005/0016366 A1 1/2005 Ito et al.
2007/0000374 A1 * 1/2007 Clark ................... G10H 1/0066 84/724
2012/0110518 A1 * 5/2012 Chan ..................... G06F 3/0233 715/863
2012/0139861 A1 6/2012 Jung et al.
2014/0083280 A1 * 3/2014 Little ...................... G06F 3/017 84/609
2014/0194202 A1 * 7/2014 Rubin ..................... A63F 13/54 463/31
(Continued)

FOREIGN PATENT DOCUMENTS

AU 2016238971 A1 * 11/2016 ........... G06F 3/0235
CA 3208465 A1 * 9/2022 ............ B25J 13/086
(Continued)

OTHER PUBLICATIONS

International Search Report and Written Opinion in corresponding International Application No. PCT/US2024/029639 with mailing date of Aug. 21, 2024.

*Primary Examiner* — Christina M Schreiber
(74) *Attorney, Agent, or Firm* — Greenblum & Bernstein, P.L.C.

(57) ABSTRACT

An arpeggiation controller musical instrument operable to receive a user hand gesture and play an arpeggiation pattern. The musical instrument includes an X-Y pad operable to detect the user hand gesture. The user hand gesture sets one or more parameters of the arpeggiation pattern. The musical instrument also includes an arpeggiation generator operable to create the arpeggiation pattern based on the user hand gesture.

23 Claims, 16 Drawing Sheets

(56) References Cited

U.S. PATENT DOCUMENTS

| | | | | |
|---|---|---|---|---|
| 2015/0013532 | A1* | 1/2015 | Adam | G09B 15/023<br>84/638 |
| 2015/0114209 | A1* | 4/2015 | Little | G10H 1/38<br>84/613 |
| 2015/0331659 | A1* | 11/2015 | Park | G06F 3/165<br>700/94 |
| 2015/0332661 | A1* | 11/2015 | Little | G10H 1/0066<br>84/645 |
| 2016/0231834 | A1* | 8/2016 | Hardi | H04L 51/046 |
| 2017/0045948 | A1* | 2/2017 | Nattukallingal | G06F 3/0383 |
| 2019/0294258 | A1* | 9/2019 | Forlines | G06F 3/0202 |
| 2022/0187924 | A1* | 6/2022 | Fribus | G06F 3/016 |
| 2022/0208160 | A1* | 6/2022 | Marticorena | G10H 1/0008 |
| 2022/0398937 | A1* | 12/2022 | Furuya | G09B 5/06 |
| 2024/0010145 | A1* | 1/2024 | Derichs | B60R 16/037 |

FOREIGN PATENT DOCUMENTS

| | | | | | |
|---|---|---|---|---|---|
| FR | 2711443 | A1 | * | 4/1995 | G10H 1/342 |
| JP | 2010066656 | A | * | 3/2010 | |
| KR | 20180102610 | A | * | 9/2018 | |
| WO | WO-0219081 | A2 | * | 3/2002 | C08L 23/08 |
| WO | WO-2022224065 | A1 | * | 10/2022 | G10H 1/0066 |

* cited by examiner

ARPEGGIATOR MUSICAL INSTRUMENT

CROSS REFERENCE TO RELATED APPLICATION

The present application claims the benefit of U.S. Provisional Application No. 63/618,113, filed Jan. 5, 2024, the contents of which are expressly incorporated herein by reference in its entirety.

BACKGROUND OF THE DISCLOSURE

1. Field of the Disclosure

The present disclosure relates to a musical instrument, and more specifically relates to a hand-controlled arpegiation controller musical instrument (or arp board), which may be physically embodied or virtually embodied on a touch screen, and method of use.

2. Background of the Disclosure

Research has established that studying music enhances academic achievement including areas of mathematics, science, geography, history, foreign language, physical education, and vocational training. For example, studies have shown that students with piano or keyboard experience performed 34% higher on tests that measure spatial-temporal lobe activity, which is the part of the brain that is used when doing mathematics, science, and engineering.

Studies have shown that music education can be used to enhance cognitive achievement in students. When a student is singing a melody with text, they are using multiple areas of their brain to multitask. Music positively impacts language development, increases IQ (Intelligence Quotient), spatial-temporal skills, and improves test scores. For example, music education has also been noted to have the ability to increase someone's overall IQ, especially in children during peak development years. Spatial ability, verbal memory, reading and mathematical ability are seen to be increased alongside music education (primarily through the learning of an instrument). Researchers also note that a correlation between general attendance and IQ increases is evident, and due to students' involvement in music education, general attendance rates increase along with their IQ. Fine motor skills, social behaviors, and emotional well-being can also be increased through music and music education. The learning of an instrument increases fine motor skills in students with physical disabilities. Emotional well-being can be increased as students find meaning in songs and connect them to their everyday life. Through social interactions of playing in groups like jazz and concert bands, students learn to socialize, and this can be linked to emotional and mental well-being.

Thus, the benefits of incorporating music, and specifically music making, on a person's well-being is well established. While these benefits of music making are clear, there are still many individuals who never learn or attempt to learn how to make music. For example, learning to play a new musical instrument can be an intimidating and imposing task.

An arpeggio is a type of broken chord in which the notes that compose a chord are individually sounded, for example, in a progressive rising or descending order. Arpeggios on keyboard instruments may be called rolled chords. Arpeggios may include all notes of a scale or a partial set of notes from a scale, but contain notes of at least three pitches (two-pitch sequences are known as trills). Arpeggios may sound notes within a single octave or span multiple octaves, and the notes may be sustained and overlap or be heard separately. An arpeggio for the chord of C major going up two octaves would be the notes (C, E, G, C, E, G, C).

Arpeggios enable composers writing for monophonic instruments that play one note at a time (such as the trumpet, for example) to voice chords and chord progressions in musical pieces. Arpeggios are also used to help create rhythmic interest, or as melodic ornamentation in the lead or accompaniment. Though the notes of an arpeggio are not sounded simultaneously, listeners may effectively hear the sequence of notes as forming a chord if played in quick succession.

Any instrument may employ arpeggiation, but arpeggios are more commonly used on instruments that serve the role of melodic lead or ornamentation. Arpeggios may be used as an alternative to continuous portamento for instruments that are not able to achieve continuous portamento (or that have limitations in achieving portamento over multiple notes of a scale), such as keyboards, fretted instruments, and monophonic instruments such as the flute, for example.

Arpeggios are commonly used in many music genres and are particularly highlighted in genres with significant focus on melody and ornamentation, such as flamenco and neoclassical. Arpeggios are an important part of jazz improvisation. On guitar, sweep-picking is a technique used for rapid arpeggiation, which is most often found in rock music and heavy metal music.

Some synthesizers contain arpeggiators, which are step sequencers designed to facilitate the playing of arpeggios (as well as non-arpeggiated sequences). The arpeggiator is a synthesizer feature that outputs an arpeggio when the user presses down a chord. In other words, an arpeggiator receives an input chords and converts the input chords into arpeggios. For example, if user a plays any chord (for example, a basic C major chord: C, E, G, and high C), the synthesizer will play an arpeggiated sequence—a looping pattern with each of those notes—played one at a time. Before arpeggiators existed, complex arpeggiating required some skill to execute effectively. With the introduction of the arpeggiator, however, it became possible for anyone to use synthesizers, for example, to play arpeggios consistently and effectively with minimal physical effort, opening the doors to entirely new genres of music including industrial music and synth-pop.

An arpeggiator may include controls for speed, range and mode (the movement of the arpeggio). A conventional arpeggiator (and the conventional controls of a conventional arpeggiator), however, limited a user's ability to create custom arpeggiation patterns with custom parameters and/or modify arpeggiation patterns in real-time.

Due to such impediments as noted above with conventional arpeggiator approaches, many people never utilize arpeggiation at all and some people never fully utilize arpeggiation in their music. Other people may begin to learn to play with arpeggiation, but give up their endeavor due to the limitations of conventional arpeggiators. As such, many people never experience or maintain the benefits of music making on their well-being.

Consequently, there is a gap in the current state of the art. Thus, there is a need for a musical instrument with an intuitive interface for arpeggiation creation that does not pose impediments to immediate musical satisfaction. More specifically, what is needed is a device that allows anyone great flexibility and freedom of expression in playing arpeggiation in real-time, allowing for arpeggiation patterns to be easily varied during a real-time performance, without the need for any aptitude, dexterity, or timing skills, without the need for any knowledge of music theory or how to compose arpeggiation patterns, and without the need for any significant education, training, or technology or computer skills. There is a need for a musical instrument with an intuitive interface for arpeggiation music creation that doesn't require a significant investment in time and energy to learn in order to play sophisticated arpeggiation patterns in real-time simply and easily, in order to provide new creative avenues for beginner and experienced musicians alike.

SUMMARY OF THE EMBODIMENTS OF THE DISCLOSURE

Aspects of the disclosure are directed to a musical instrument that allows anyone great flexibility and freedom of expression in playing an arpeggiation in real-time, allowing for arpeggiation patterns to be easily varied during a real-time performance, without the need for any aptitude, dexterity, or timing skills, without the need for any knowledge of music theory or how to compose arpeggiation patterns, and without the need for any significant education, training, or technology or computer skills. Embodiments of the present disclosure are directed to a musical instrument with an intuitive interface for arpeggiation music creation that doesn't require a significant investment in time and energy to learn in order to play sophisticated arpeggiation patterns in real-time simply and easily, in order to provide new creative avenues for beginner and experienced musicians alike.

Aspects of the disclosure are directed to an arpeggiation controller musical instrument operable to receive a user hand gesture and play an arpeggiation pattern. The musical instrument includes an X-Y pad operable to detect the user hand gesture. The user hand gesture sets one or more parameters of the arpeggiation pattern. The musical instrument also includes an arpeggiation generator operable to create the arpeggiation pattern based on the user hand gesture.

In embodiments, the X-Y pad comprises at least one of one or more MIDI polyphonic expression (MPE) controllers, a surface comprising a touch point, a finger-actuatable continuous controller touch point, an optical diode, a plurality of continuous touch sensitive strips, and a mini-touch screen display.

In further embodiments, the X-Y pad comprises a vertical center line and a horizontal center line.

In additional embodiments, an upward swipe on the X-Y pad produces an ascending arpeggiation pattern.

In yet additional embodiments, a downward swipe on the X-Y pad produces a descending arpeggiation pattern.

In embodiments, after performing a swipe gesture, continuing to depress or maintain contact with the X-Y pad at an end point of swipe gesture causes the arpeggiation controller musical instrument to repeat the arpeggiation pattern.

In further embodiments, the arpeggiation controller musical instrument repeats the arpeggiation pattern until contact with the X-Y pad is released.

In additional embodiments, the arpeggiation controller musical instrument repeats the arpeggiation pattern for a configurable number of repeats.

In yet additional embodiments, a length of the upward-downward swipe on the X-Y pad determines a number of octaves in the arpeggiation pattern.

In embodiments, an upward-downward swipe on the X-Y pad crossing a horizontal center line of the X-Y pad adds ½ octaves or one or more octaves above and below a single-octave arpeggiation dependent upon a vertical length of the upward-downward swipe.

In further embodiments, an upward-downward swipe on the X-Y pad produces an ascending-then-descending arpeggiation pattern.

In additional embodiments, an upward-downward-upward swipe on the X-Y pad produces an ascending-then-descending-then-ascending arpeggiation pattern.

In yet additional embodiments, an upward-downward-downward-upward swipe on the X-Y pad produces an ascending-then-descending-then-descending-then-ascending arpeggiation pattern.

In embodiments, a rate of the upward-downward swipe on the X-Y pad determines a speed of the arpeggiation pattern.

In further embodiments, a rightward-leftward swipe of the X-Y pad adjusts one or more parameters for the arpeggiation pattern.

In additional embodiments, a beginning point of the upward-downward swipe on the X-Y pad determines a starting note of the arpeggiation pattern.

In yet additional embodiments, an ending point of the upward-downward swipe on the X-Y pad determines an ending note of the arpeggiation pattern.

In embodiments, a curved swipe on the X-Y pad establishes the parameters of the arpeggiation pattern based on both vertical aspects of the arpeggiation pattern and the horizontal aspects of the arpeggiation pattern.

In further embodiments, the parameters for the arpeggiation pattern include at least one of: probability of specific notes sounding; velocity variations; length of notes; gate variation; legato; and staccato.

In additional embodiments, the arpeggiation controller musical instrument further comprises one or more encoders for varying one or more parameters of the arpeggiation controller musical instrument.

In yet additional embodiments, the arpeggiation controller musical instrument further comprises one or more encoders for varying one or more parameters of the arpeggiation controller musical instrument.

In additional embodiments, the one or more parameters of the arpeggiation controller musical instrument include at least one of: a number of steps; sync quantization; order algorithm; transposition; introduction of randomness; sequencing of arpeggiated patterns; velocity; note substitution; key substation; key imposition; gate time; swing; MIDI channel; LFO parameter modulation; filter; effects; ADSR envelope modification; reverse; note repeat; polyphony; jumps; pre-defined pattern overlay; voicing; range; timing; cycles; division; pace; delay; rotation; harmony; tempo; probability; automation; and latching.

Additional aspects of the disclosure are directed to a method of creating an arpeggiation pattern. The method comprises receiving a user hand gesture on an X-Y pad operable to detect the user hand gesture, wherein the user hand gesture sets one or more parameters of the arpeggiation pattern; and playing the arpeggiation pattern based on the user hand gesture.

Implementing aspects of the disclosure provides a musical instrument with an intuitive interface for music creation that does not pose impediments (e.g., extensive knowledge and/or physical dexterity) to immediate musical satisfaction. For example, in contrast to a conventional arpeggiator, where it can usually take many months of daily practice to progress enough to actually produce hit patterns in real-time, with embodiments of the present disclosure, a musical instrument is provided in which neither extensive knowledge of arpeggiation patterns, nor dexterity are necessary to achieve immediate musical satisfaction. In other words, with the embodiments of the musical instrument of the present disclosure, it does not take significant time for a user to learn how to play the instrument in order to actually make more complex arpeggiation music. Additionally, implementing aspects of the disclosure provides a musical instrument with an intuitive interface for music creation that doesn't require a significant investment in time and energy to learn in order to play sophisticated arpeggiation patterns in real-time simply and easily, thus providing new creative avenues for beginner and experienced musicians alike.

Embodiments of the present disclosure provide a musical instrument that allows anyone great flexibility and freedom of expression in playing arpeggiations in real-time, allowing for arpeggiation patterns to be easily varied during a real-time performance, without the need for any aptitude, dexterity, or timing skills, without the need for any knowledge of music theory or how to compose arpeggiations, and without the need for any significant education, training, or technology or computer skills.

As such, by implementing aspects of the disclosure, many more people may more readily access and experience playing music, and thereby experience the resulting benefits of music making on their well-being.

BRIEF DESCRIPTION OF THE DRAWINGS

The novel features which are characteristic of the musical instrument, both as to structure and method of operation thereof, together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the embodiments of the disclosure in conjunction with the following exemplary and non-limiting drawings, in which.

DETAILED DESCRIPTION OF THE EMBODIMENTS OF THE DISCLOSURE

Figure 1:
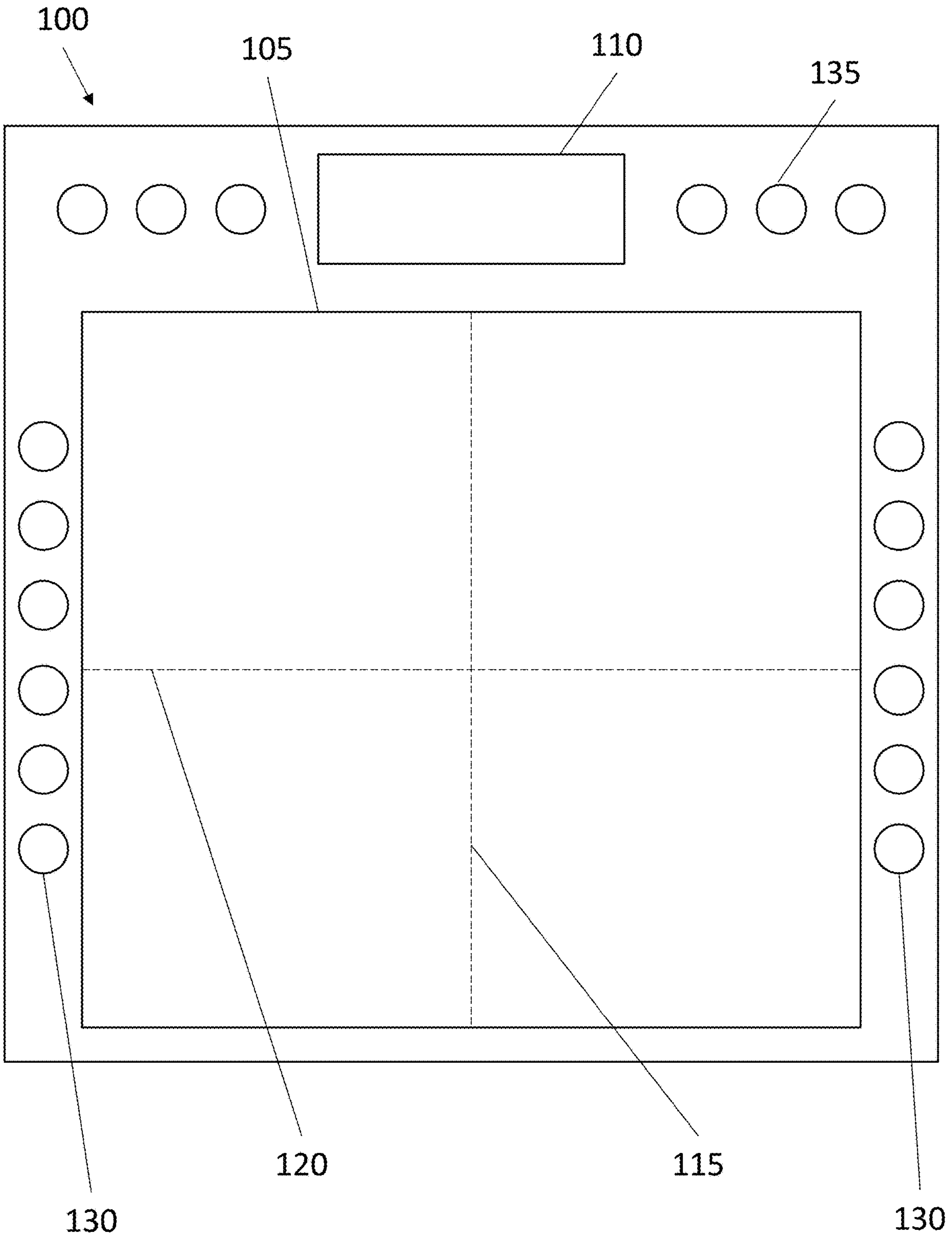
FIG. 1 shows an exemplary depiction of an arpeggiation controller musical instrument (or arp board) in accordance with aspects of the disclosure.

The novel features which are characteristic of the disclosure, both as to structure and method of operation thereof, together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure.

In the following description, the various embodiments of the present disclosure will be described with respect to the enclosed drawings. As required, detailed embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the embodiments of the present disclosure. In this regard, no attempt is made to show structural details of the embodiments of the present disclosure in more detail than is necessary for the fundamental understanding of the embodiments of the present disclosure. The description, taken with the drawings, makes apparent to those skilled in the art how the forms of the embodiments of the present disclosure may be embodied in practice.

As used herein, the singular forms "a," "an," and "the" include the plural reference unless the context clearly dictates otherwise. As used herein, the indefinite article "a" indicates one as well as more than one and does not necessarily limit its referent noun to the singular.

Except where otherwise indicated, all numbers expressing quantities used in the specification and claims are to be understood as being modified in all examples by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e., the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly, "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for example a composition comprising a compound A may include other compounds besides A. However, the term "comprising" also covers the more restrictive meanings of "consisting essentially of" and "consisting of", so that for example "a composition comprising a compound A" may also (essentially) consist of the compound A.

The various embodiments disclosed herein can be used separately and in various combinations unless specifically stated to the contrary.

MIDI (/'midi/; Musical Instrument Digital Interface) is a technical standard that describes a communications protocol, digital interface, and electrical connectors that connect a wide variety of electronic musical instruments, computers, and related audio devices for playing, editing, and recording music. The specification originates in the paper Universal Synthesizer Interface published by Dave Smith and Chet Wood of Sequential Circuits at the 1981 Audio Engineering Society conference in New York City. A single MIDI cable can carry up to sixteen channels of MIDI data, each of which can be routed to a separate device. Each interaction with a key, button, knob or slider is converted into a MIDI event, which specifies musical instructions, such as a note's pitch, timing and loudness. One common MIDI application is to play a MIDI keyboard or other controller and use it to trigger a digital sound module (which contains synthesized musical sounds) to generate sounds, which the audience hears produced by an amplifier (e.g., a keyboard amplifier). MIDI data can be transferred via MIDI or USB cable, or recorded to a sequencer or digital audio workstation to be edited or played back.

A MIDI controller is any hardware or software that generates and transmits Musical Instrument Digital Interface (MIDI) data to MIDI-enabled devices, typically to trigger sounds and control parameters of an electronic music performance. They most often use a musical keyboard to send data about the pitch of notes to play, although a MIDI controller may trigger other effects. Such a device provides a musical keyboard and perhaps other actuators (pitch bend and modulation wheels, for example) but produces no sound on its own. It is intended only to drive other MIDI devices. Electronic musical instruments, including synthesizers, samplers, drum machines, and electronic drums, are used to perform music in real-time and are able to transmit a MIDI data stream of the performance. Some are keyboard-only controllers, though many include other real-time controllers such as sliders, knobs, and wheels. Commonly, there are also connections for sustain and expression pedals.

A MIDI keyboard or controller keyboard is typically a piano-style electronic musical keyboard, often with other buttons, wheels and sliders, used for sending MIDI signals or commands over a USB or MIDI five-pin cable to other musical devices or computers. MIDI keyboards lacking an onboard sound module cannot produce sounds themselves, however some models of MIDI keyboards contain both a MIDI controller and sound module, allowing them to operate independently. When used as a MIDI controller, MIDI information on keys or buttons the performer has pressed is sent to a receiving device capable of creating sound through modeling synthesis, sample playback, or an analog hardware instrument. The receiving device could be:

a computer running a digital audio workstation (DAW) or a standalone VST/AU software instrument (the receiving device can also be used to re-route the MIDI signal to other devices);

a sound module; or a digital or analog hardware instrument with MIDI capability, such as a synthesizer or electronic piano or drum machine.

A typical signal path for a MIDI controller may include, for example:

MIDI controller→five-pin MIDI connector or USB cable→computer running a DAW or a standalone VST/AU software instrument or a sound module or an electronic piano, stage piano, or synthesizer with MIDI capability→audio sound device (amplifier and speakers or headphones).

Control surfaces are hardware devices that provide a variety of controls that transmit real-time controller messages transmitted over MIDI or a proprietary format. These enable software instruments to be programmed without the discomfort of excessive mouse movements, or adjustment of hardware devices without the need to step through layered menus, for example. Buttons, sliders, and knobs are the most common controllers provided, but rotary encoders, transport controls, joysticks, ribbon controllers, vector touchpads, and optical controllers may also be utilized. Controllers may be general-purpose devices that are designed to work with a variety of equipment, or they may be designed to work with a specific piece of software.

Sequencers store and retrieve MIDI data and send the data to MIDI-enabled instruments in order to reproduce a performance.

Software synthesizers offer great power and versatility, but some players feel that division of attention between a MIDI keyboard and a computer keyboard and mouse robs some of the immediacy from the playing experience. In contrast, devices dedicated to real-time MIDI control provide an ergonomic benefit and can provide a greater sense of connection with the instrument than can an interface that is accessed through a mouse and computer keyboard.

Aspects of the disclosure are directed to a arpeggiation controller musical instrument, which plays and controls an arpeggiation pattern in real-time by use of hand gestures on an intuitive hand-controlled user interface. In embodiments, the hand-controlled user interface may be a physical user interface. In other embodiments, the hand-controlled user interface may be a touch screen user interface.

FIG. 1 shows an exemplary depiction of an arpeggiation controller musical instrument (or arp board) 100 in accordance with aspects of the disclosure. As shown in FIG. 1, the arp board 100 includes an X-Y pad 105 and a display 110. Center lines including a vertical center line 115 and a horizontal center line 120 are shown (in dotted lines) on the X-Y pad 105 for reference to show the upper and lower regions of the X-Y pad 105 and the left and right regions of the X-Y pad 105. In some contemplated embodiments, the center lines are not shown on the pad 105 and are provided in the figures of the application to assist in understanding aspects of the disclosure. In other contemplated embodiments, however, the X-Y pad 105 may include the center lines 115, 120 for a user to more easily discern the upper and lower regions of the X-Y pad 105 and the left and right regions of the X-Y pad 105 (or the four quadrants of the X-Y pad 105). In embodiments, the center lines 115, 120 may be visually displayed and/or may include tactile surfaces (e.g., a discernible bump or ridge). In contemplated embodiments, the X-Y pad 105 is MPE enabled. For example, in some embodiments, the X-Y pad may comprise one or more MIDI polyphonic expression (MPE) controllers. The X-Y pad 105 may be any surface comprising a touch point (e.g., a finger-actuatable continuous controller touch point), such as an optical diode for instance, or, as a second example, a plurality of continuous touch sensitive strips or a mini-touch screen display, where a player sliding their finger around could select the enumerated variations. Additionally, the disclosure contemplates that the X-Y pad 105 may comprise physical materials that, for example, include depressions (and/or protrusions) to mark the vertical and horizontal center lines.

Figure 2:
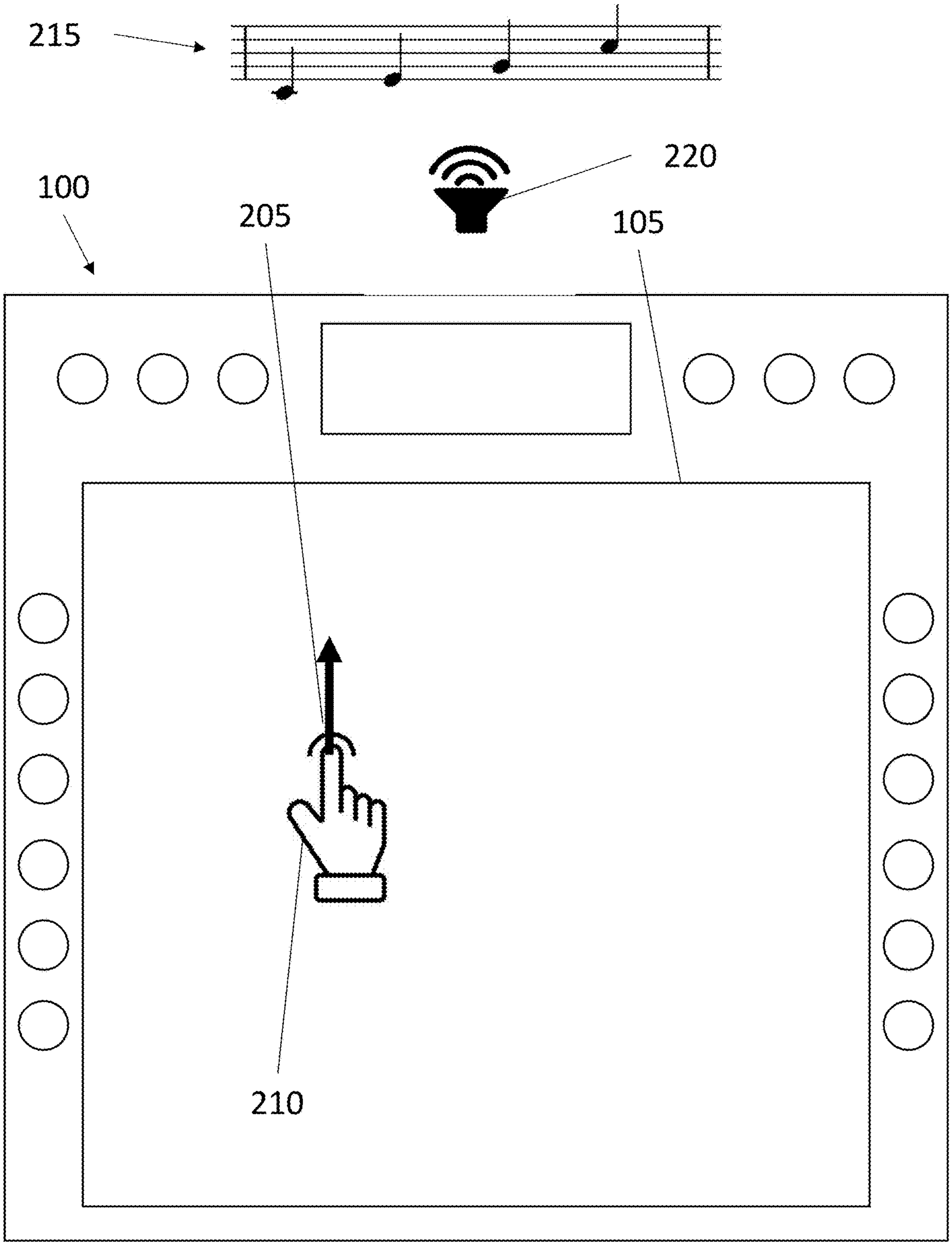
FIG. 2 shows an exemplary depiction of an arpeggiation controller musical instrument (or arp board) with details of the X-Y pad for detecting user gestures in accordance with aspects of the disclosure.

FIG. 2 shows an exemplary depiction of an arpeggiation controller musical instrument (or arp board) 100 with details of the X-Y pad 105 for detecting user gestures in accordance with aspects of the disclosure. As shown in FIG. 2, in accordance with aspects of the disclosure, the X-Y pad 105 is operable to detect a user's hand gestures 205 to control one or more parameters of an arpeggiation pattern. More specifically, the X-Y pad 105 is operable to detect one or more of a direction, a speed, a start point and an end point of a hand gesture 205 of a user's hand 210 (e.g., index finger) to define one or more parameters of an arpeggiation pattern (e.g., exemplary arpeggiation pattern 215) and the arpeggiation controller musical instrument 100 is operable to play the arpeggiation pattern 215 in real-time via an internal and/or external speaker 220. In other words, in accordance with aspects of the disclosure, the X-Y pad 105 is operable to detect a user's gesture or gestures 205 and the arpeggiation controller musical instrument 100 is operable to translate the gesture or gestures 205 into one or more arpeggiated patterns 215.

In this fashion, in accordance with aspects of the disclosure, the user with no special aptitude, dexterity, or timing skills can create or modify an arpeggiation pattern in a real-time performance. For example, without need for any knowledge of music theory and/or knowledge of how to compose or alter arpeggiation patterns, a user has great flexibility in varying arpeggiation patterns in real-time. And, in accordance with aspects of the disclosure, a user can begin using the arpeggiation controller virtually immediately, without the need for any significant education, training, technology, or computer skills.

Figure 3:
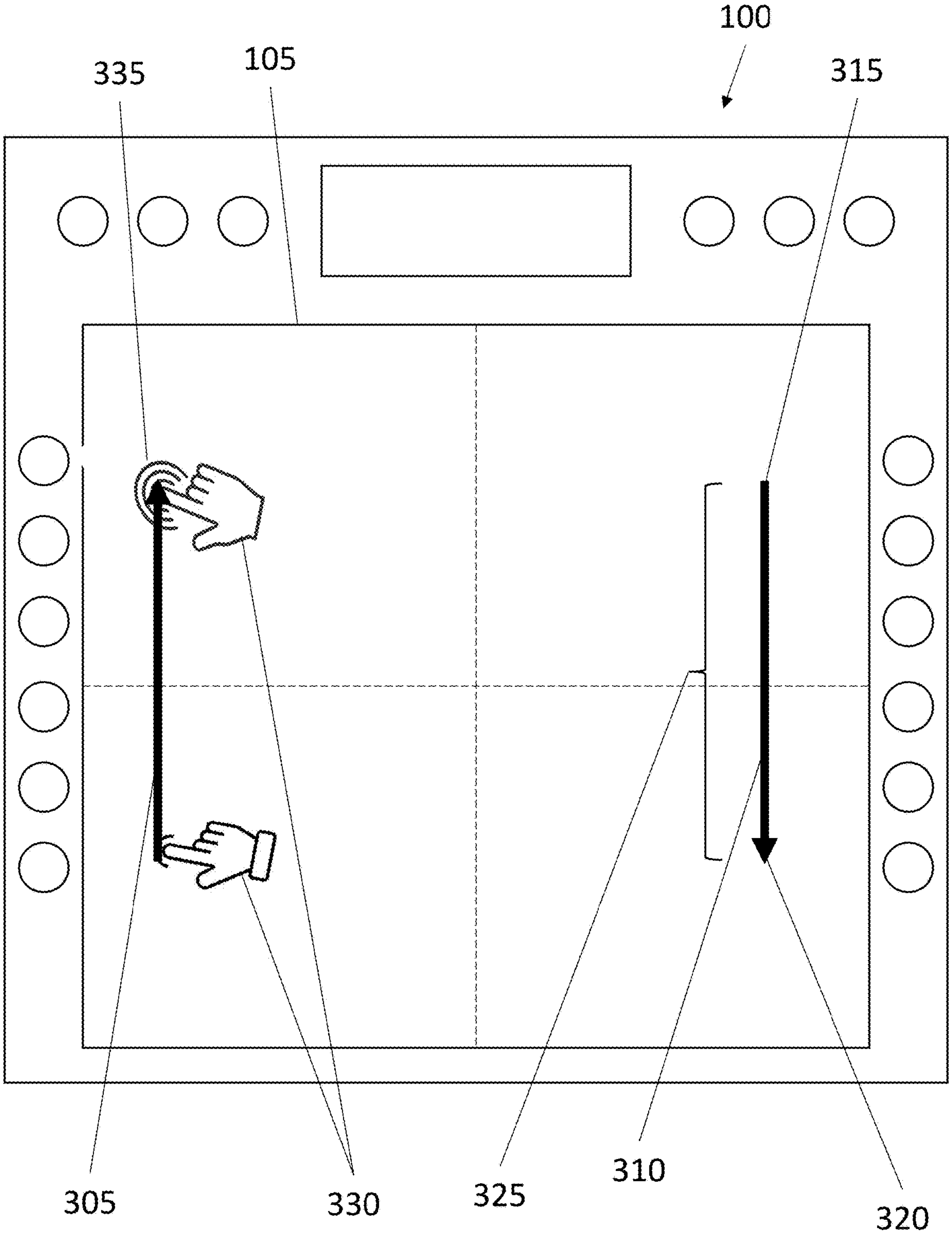
FIG. 3 shows an exemplary depiction of upward swipe gesture and a downward swipe gesture on an arpeggiation controller musical instrument (or arp board) in accordance with aspects of the disclosure.

FIG. 3 shows an exemplary depiction of upward swipe gesture 305 and a downward swipe gesture 310 on an arpeggiation controller musical instrument (or arp board) 100 in accordance with aspects of the disclosure. As shown in FIG. 3, the X-Y pad 105 is operable to detect a user's hand gestures to control one or more parameters of an arpeggiation pattern. For example, an upward swipe gesture 305 (or Swipe Up) creates an upward (or ascending) arpeggiated pattern that starts from lowest note to highest note, and then starts at the lowest note again and repeats. Additionally, a downward swipe gesture 310 (or Swipe Down) creates a downward (or descending) arpeggiated pattern that starts from highest note to lowest note, and then starts at highest note again and repeats (e.g., indefinitely, if the user holds finger down at end of swipe). In such a manner, a user can easily define the direction of the arpeggiation (e.g., descending or ascending) and the range 325 of the arpeggiation with a single swipe gesture. For example, with reference to the downward swipe gesture 310, a user can easily define the descending direction by swiping downwardly in the y-direction. Additionally, the user can easily define the range 325 of the arpeggiation with the single swipe gesture 310 by defining the highest note of the arpeggiation from the highest point 315 of the swipe gesture 310 and by defining the lowest note of the arpeggiation from the lowest point 320 of the swipe gesture 310. As shown in FIG. 3, after performing a swipe gesture, a user may continue to depress 335 their finger 330 on the X-Y pad 105 (or maintain contact with the X-Y pad 105) at the end point of the range, which in embodiments, will cause the arpeggiation controller musical instrument 100 to repeat the arpeggiation pattern (e.g. until released or for a configurable number of repeats).

Figure 4:
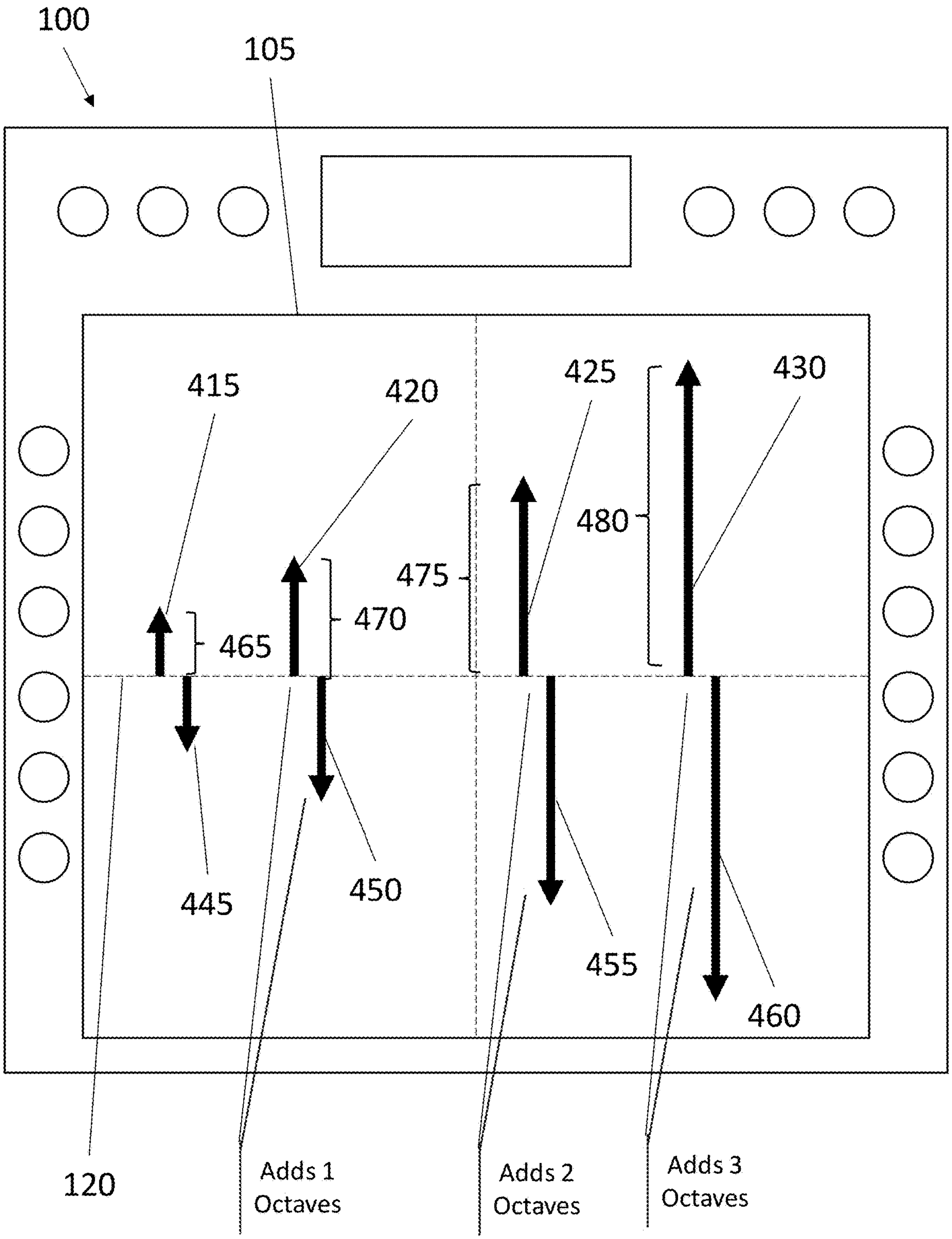
FIG. 4 shows an exemplary depiction of shorter and longer upward swipe gestures and a shorter and longer downward swipe gestures on an arpeggiation controller musical instrument (or arp board) in accordance with aspects of the disclosure.

FIG. 4 shows an exemplary depiction of shorter and longer upward swipe gestures and a shorter and longer downward swipe gestures on an arpeggiation controller musical instrument (or arp board) 105 in accordance with aspects of the disclosure. As shown in FIG. 4, with a short 465 upward swipe gesture 415 or a short downward swipe gesture 445 starting from the horizontal center line 120, the arpeggiation controller musical instrument 100 produces an arpeggiated pattern (ascending or descending) in one octave. With a longer 470 upward swipe gesture 420 or a longer 470 downward swipe gesture 450 starting from the horizontal center line 120, the arpeggiation controller musical instrument 100 produces an arpeggiated pattern (ascending or descending) in two octaves. With a yet longer 475 upward swipe gesture 425 or a yet longer 475 downward swipe gesture 455 starting from the horizontal center line 120, the arpeggiation controller musical instrument 100 produces an arpeggiated pattern (ascending or descending) in three octaves. With an even longer 480 upward swipe gesture 430 or even longer 480 downward swipe gesture 460 starting from the horizontal center line 120, the arpeggiation controller musical instrument 100 produces an arpeggiated pattern (ascending or descending) in four octaves. In such a manner, a user can easily define the range (e.g., number of octaves) from the lowest note to the highest note (or vice versa) of the arpeggiation with a single swipe gesture.

Figure 5:
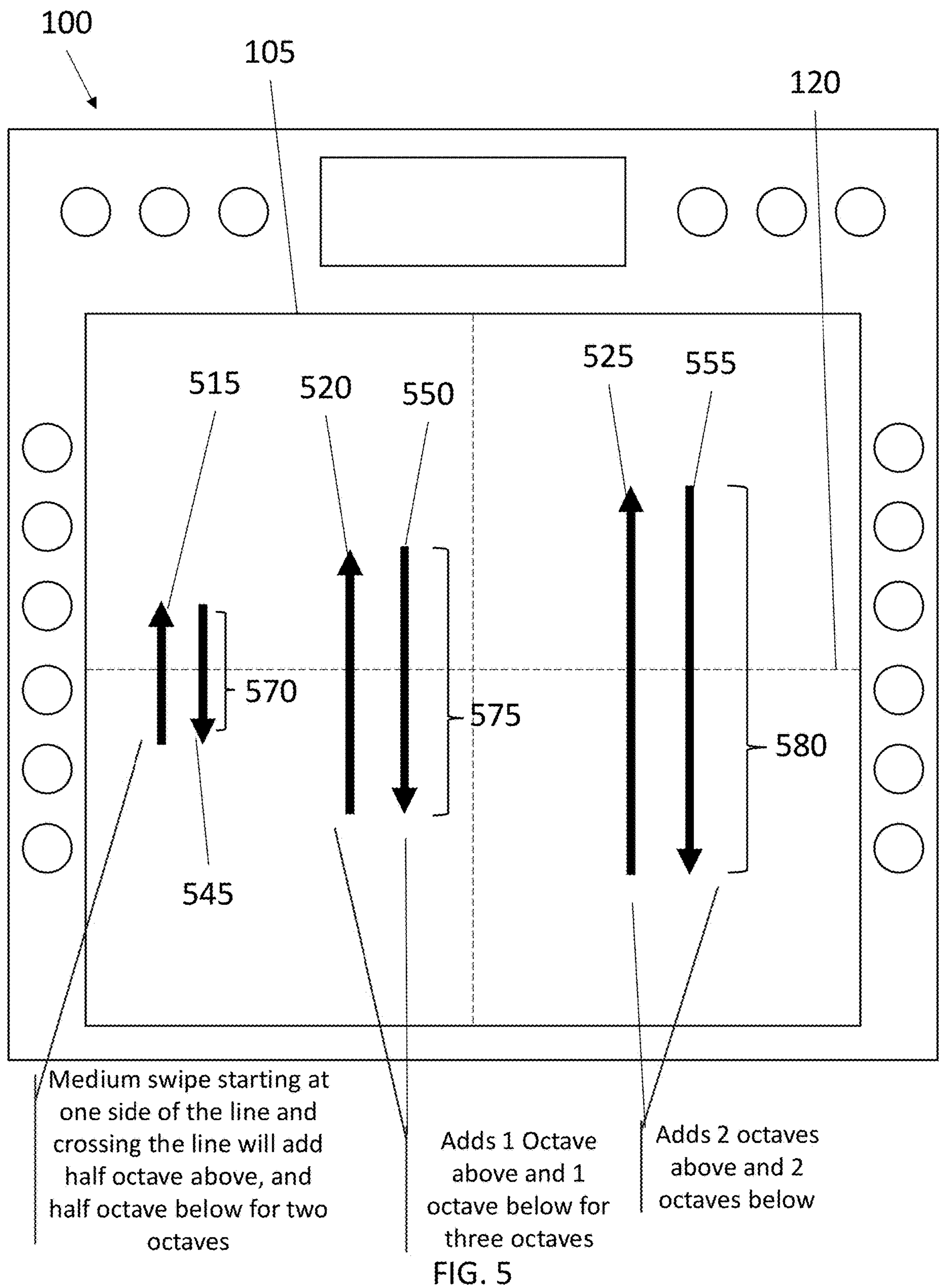
FIG. 5 shows an exemplary depiction of shorter and longer upward swipe gestures and a shorter and longer downward swipe gestures that span the midline on an arpeggiation controller musical instrument (or arp board) in accordance with aspects of the disclosure.

FIG. 5 shows an exemplary depiction of shorter and longer upward swipe gestures and a shorter and longer downward swipe gestures that span the horizontal center line 120 (or midline) on an arpeggiation controller musical instrument (or arp board) 100 in accordance with aspects of the disclosure. For example, with a medium 570 upward swipe gesture 515 (or a medium 570 downward swipe gesture 545) starting at one side of the horizontal center line 120 and crossing the horizontal center line 120, the arpeggiation controller musical instrument 100 produces an arpeggiation with an added half octave above, and an added half octave below (for an arpeggiation with a range having a total of two octaves). With a longer 575 upward swipe gesture 520 (or a longer 575 downward swipe gesture 550) starting at one side of the horizontal center line 120 and crossing the horizontal center line 120, the arpeggiation controller musical instrument 100 produces an arpeggiation with an added octave above and added octave below (for an arpeggiation with a range having a total of three octaves). With an even longer 580 upward swipe gesture 525 (or a longer 580 downward swipe gesture 555) starting at one side of the horizontal center line 120 and crossing the horizontal center line 120, the arpeggiation controller musical instrument 100 produces an arpeggiation with a two added octaves above and two added octaves below (for an arpeggiation with a range having a total of five octaves). In such a manner, a user can easily extend the range of the arpeggiation to include additional upper and lower octaves.

Figure 6:
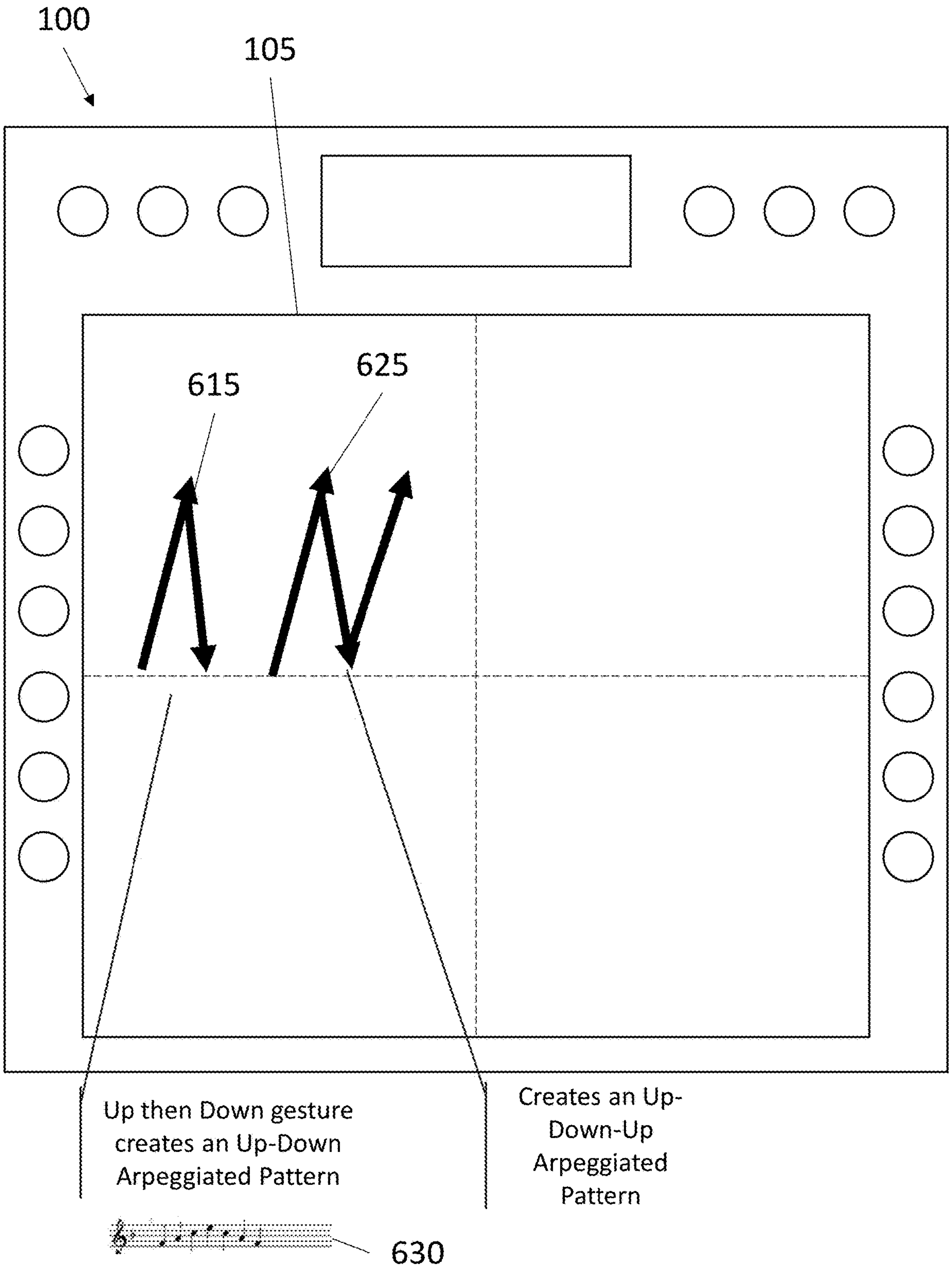
FIG. 6 shows an exemplary depiction of an upward/downward swipe gesture and an upward/downward/upward swipe gesture on an arpeggiation controller musical instrument (or arp board) in accordance with aspects of the disclosure.

FIG. 6 shows an exemplary depiction of an upward/downward swipe gesture and an upward/downward/upward swipe gesture on an arpeggiation controller musical instrument (or arp board) 100 in accordance with aspects of the disclosure. As shown in FIG. 6, with an upward/downward swipe gesture 615, the arpeggiation controller musical instrument 100 produces an Up-Down arpeggiated pattern (e.g., arpeggiation 630). That is, with the upward/downward swipe gesture 615, the arpeggiation pattern includes an ascending arpeggio followed by a descending arpeggio. Additionally, with an upward/downward/upward swipe gesture 625, the arpeggiation controller musical instrument 100 produces an Up-Down-Up Arpeggiated Pattern. That is, with the upward/downward/upward swipe gesture 625, the arpeggiation pattern includes an ascending arpeggiation pattern followed by a descending arpeggiation pattern followed by an ascending arpeggio. In such a manner, in accordance with aspects of the disclosure, a user can easily create sequential arpeggiation patterns that move in different directions (e.g., ascending or descending directions).

Figure 7:
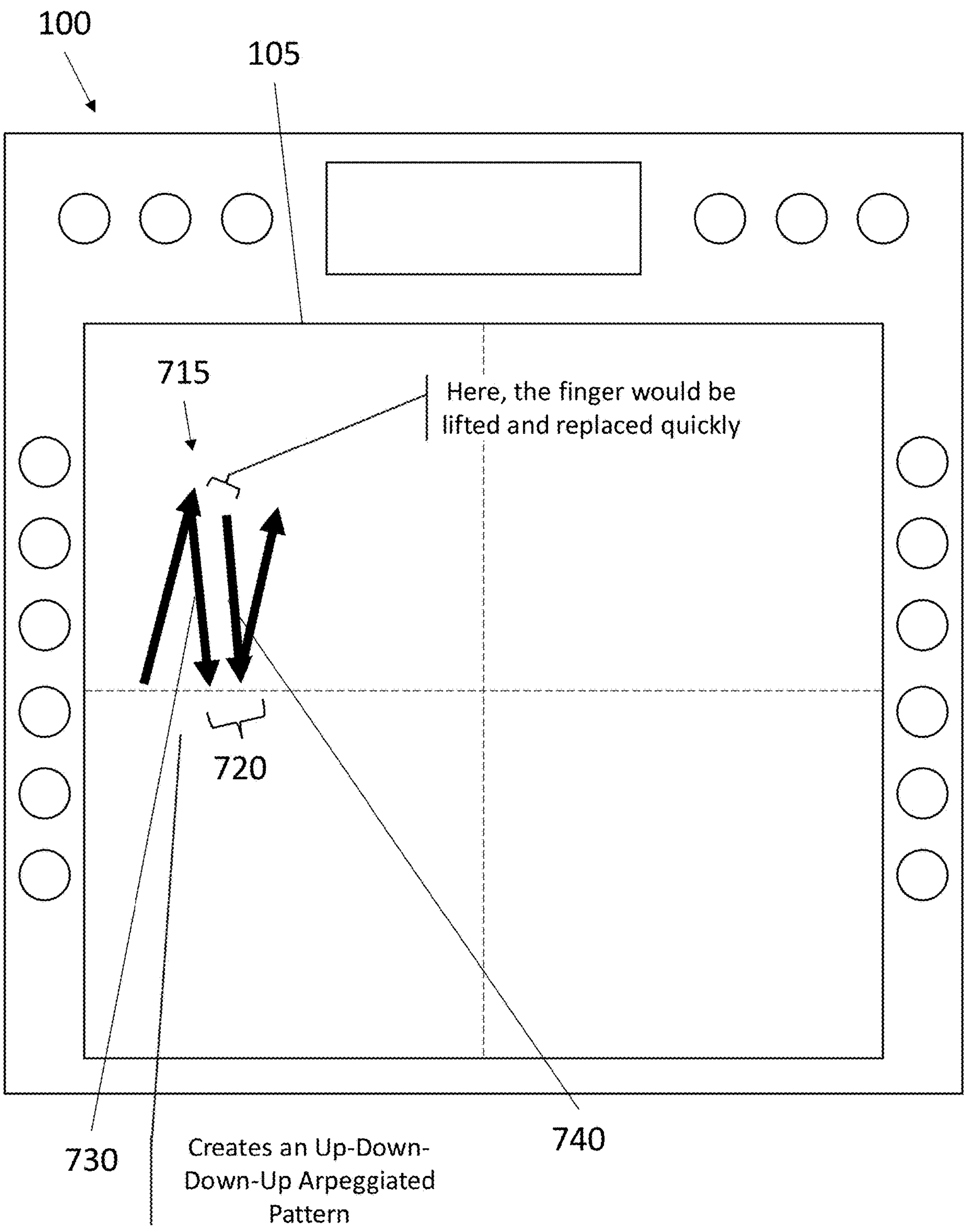
FIG. 7 shows an exemplary depiction of an upward/downward/downward/upward swipe gesture on an arpeggiation controller musical instrument (or arp board) in accordance with aspects of the disclosure.

FIG. 7 shows an exemplary depiction of an upward/downward/downward/upward swipe gesture on an arpeggiation controller musical instrument (or arp board) 100 in accordance with aspects of the disclosure. As shown in FIG. 7, with the upward/downward/downward/upward swipe gesture 715, the arpeggiation controller musical instrument 100 produces an Up-Down-Down-Up Arpeggiated Pattern. As depicted in FIG. 7, to achieve the Down-Down gesture 720, a user would lift their finger after the first downward swipe 730 and then commence the second downward swipe 740. In such a manner, in accordance with aspects of the disclosure, a user can easily create sequential arpeggiation patterns that move in different directions and same directions (e.g., ascending or descending directions).

Figure 8:
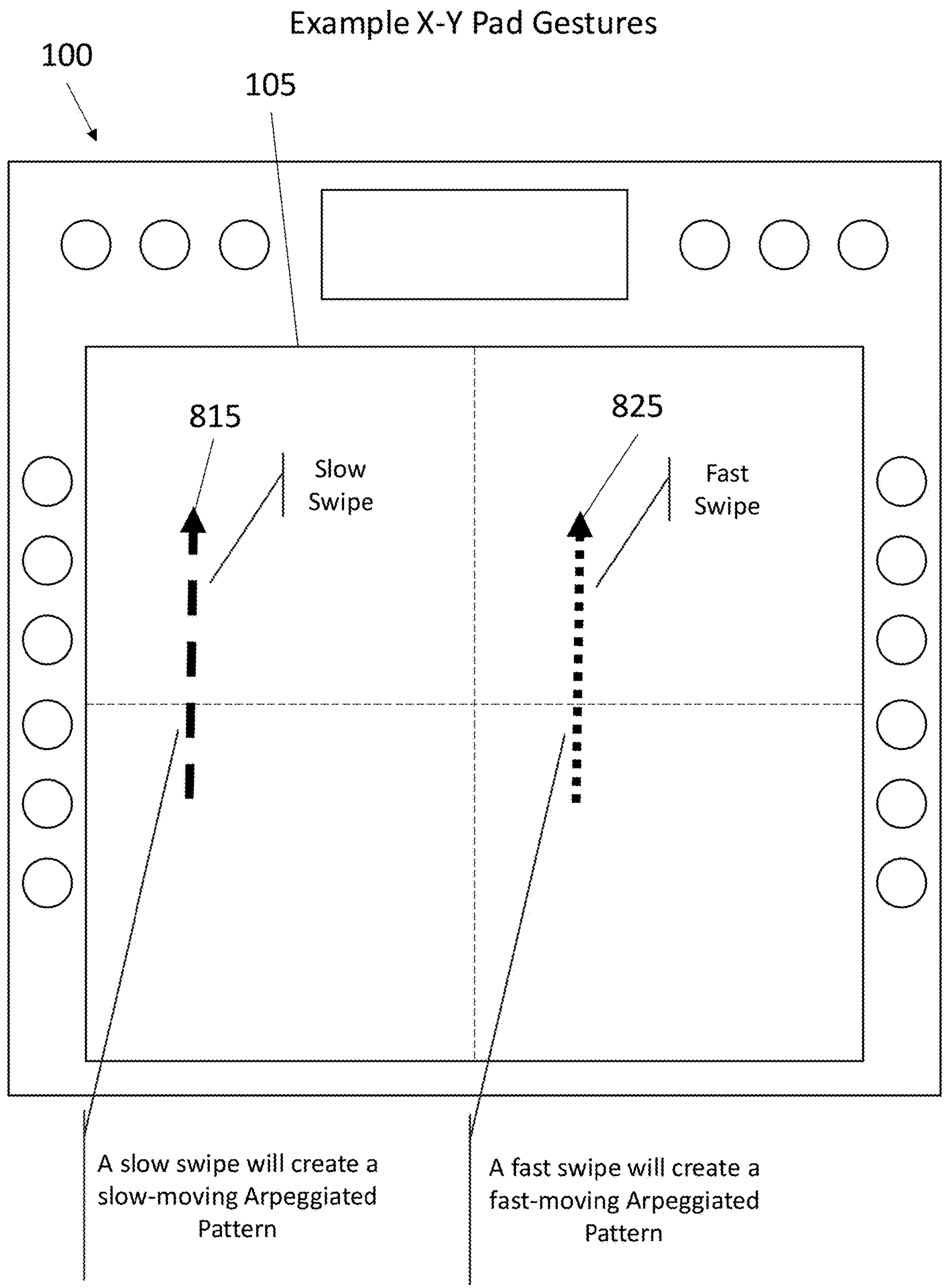
FIG. 8 shows an exemplary depiction of a slower-moving swipe gesture and faster-moving swipe gesture on an arpeggiation controller musical instrument (or arp board) in accordance with aspects of the disclosure.

FIG. 8 shows an exemplary depiction of a slower-moving swipe gesture and faster-moving swipe gesture on an arpeggiation controller musical instrument (or arp board) 100 in accordance with aspects of the disclosure. As should be understood, while the speed of the gestures is represented in differing dotted lines, a user's finger remains in contact with the X-Y pad 105 throughout the duration of the swipe gesture. As shown in FIG. 8, a slow swipe gesture 815 will create a slow moving Arpeggiated Pattern and a fast swipe gesture 825 will create a fast moving Arpeggiated Pattern. In such a manner, in accordance with aspects of the disclosure, a user can easily and intuitively vary a speed of an arpeggiation pattern in real-time.

Figure 9:
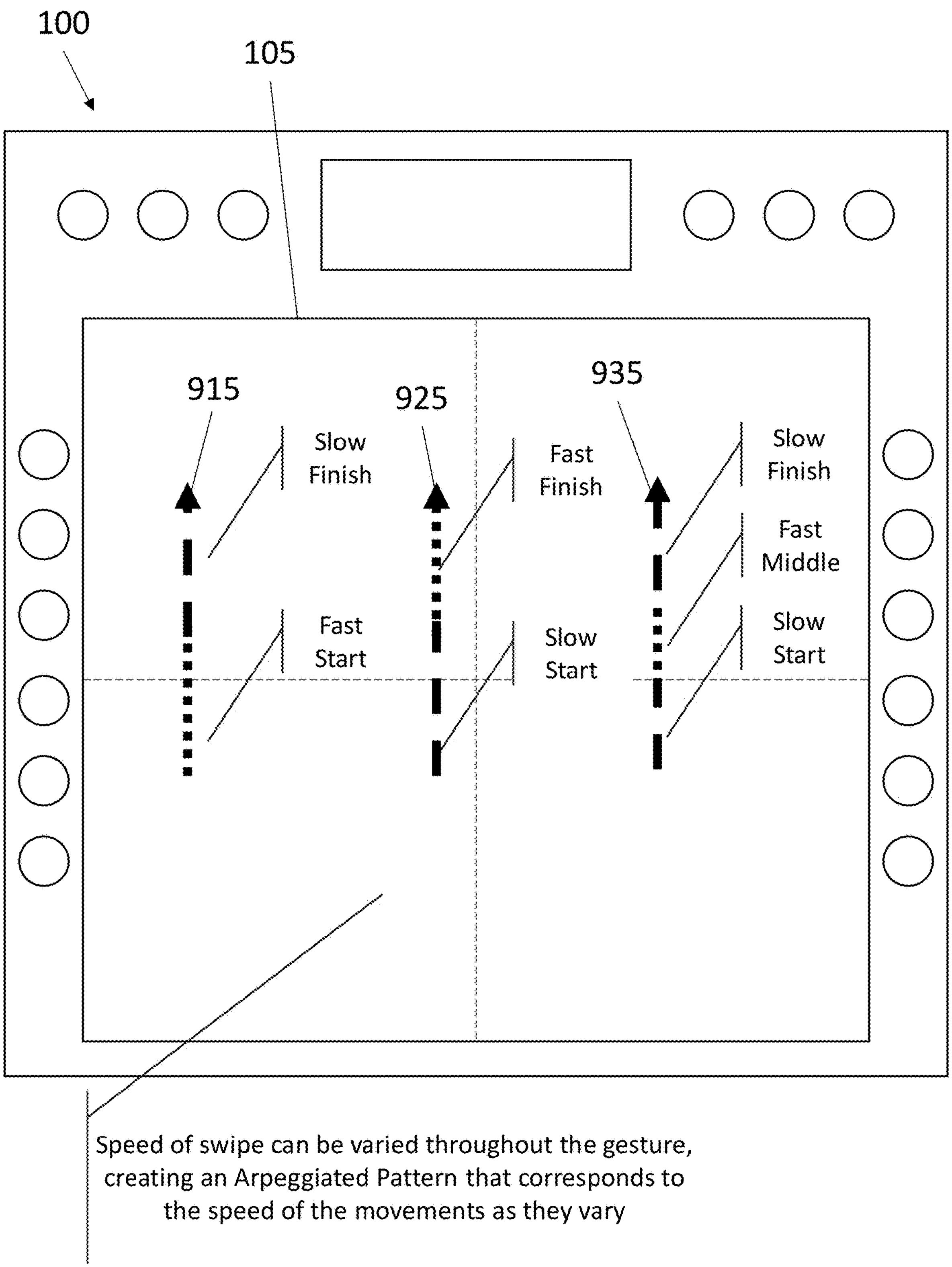
FIG. 9 shows an exemplary depiction of variable speed swipe gestures including a fast-starting and slow-finishing swipe gesture, a slow-starting and fast-finishing swipe gesture, and a slow-starting and slow-finishing with a faster-moving middle section swipe gesture on an arpeggiation controller musical instrument (or arp board) in accordance with aspects of the disclosure.

FIG. 9 shows an exemplary depiction of variable speed swipe gestures including a fast-starting and slow-finishing swipe gesture 915, a slow-starting and fast-finishing swipe gesture 925, and a slow-starting and slow-finishing with a faster-moving middle section swipe gesture 935 on an arpeggiation controller musical instrument (or arp board) 100 in accordance with aspects of the disclosure. As shown in FIG. 9, a speed of swipe on the X-Y pad 105 can be varied throughout the gesture, creating an Arpeggiated Pattern that corresponds to the speed of the movements as they vary. In such a manner, in accordance with aspects of the disclosure, a user can easily and intuitively create a variable-speed arpeggiation pattern in real-time.

Figure 10:
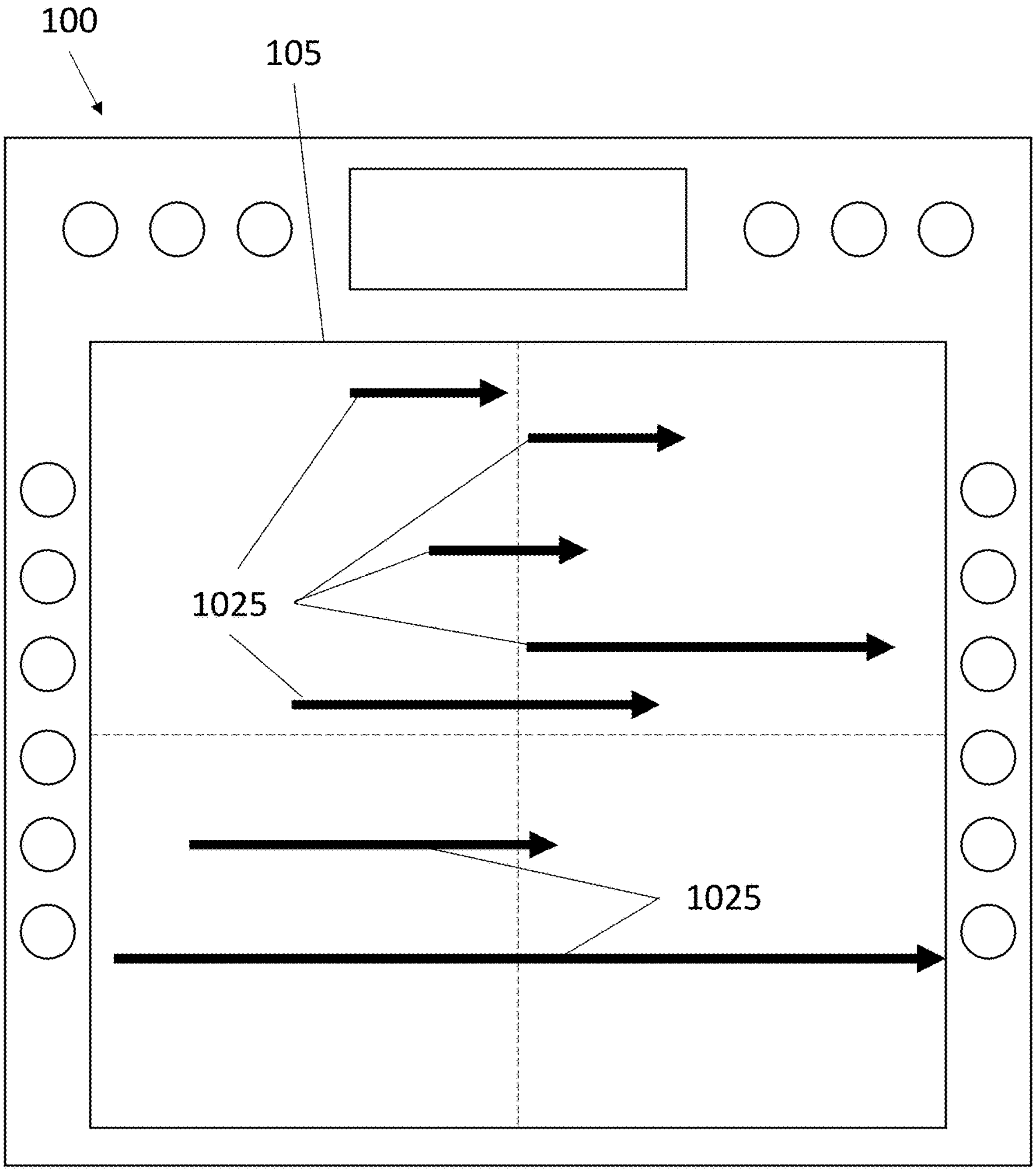
FIG. 10 shows an exemplary depiction of horizontal swipe gestures for controlling arpeggiation parameters on an arpeggiation controller musical instrument (or arp board) in accordance with aspects of the disclosure.

FIG. 10 shows an exemplary depiction of horizontal swipe gestures 1025 for controlling arpeggiation parameters on an arpeggiation controller musical instrument (or arp board) 100 in accordance with aspects of the disclosure. As shown in FIG. 10, a user may utilize one or more horizontal swipe gestures 1025 on the X-Y pad 105 for controlling arpeggiation parameters. For example, horizontal movement, start point, end point, and/or speed of the gesture 1025 may be used to adjust other attributes of the arpeggiation pattern. For example: arpeggiation parameters controllable/adjustable by horizontal swipe gestures 1025 may include:

1. Probability of specific notes sounding,
2. Velocity Variations,

3. Length of Notes
4. Gate variation
5. Legato, Staccato, Etc.

In such a manner, in accordance with aspects of the disclosure, a user can easily and intuitively control/adjust arpeggiation parameters for the arpeggiation controller musical instrument, for example, in real-time.

Figure 11:
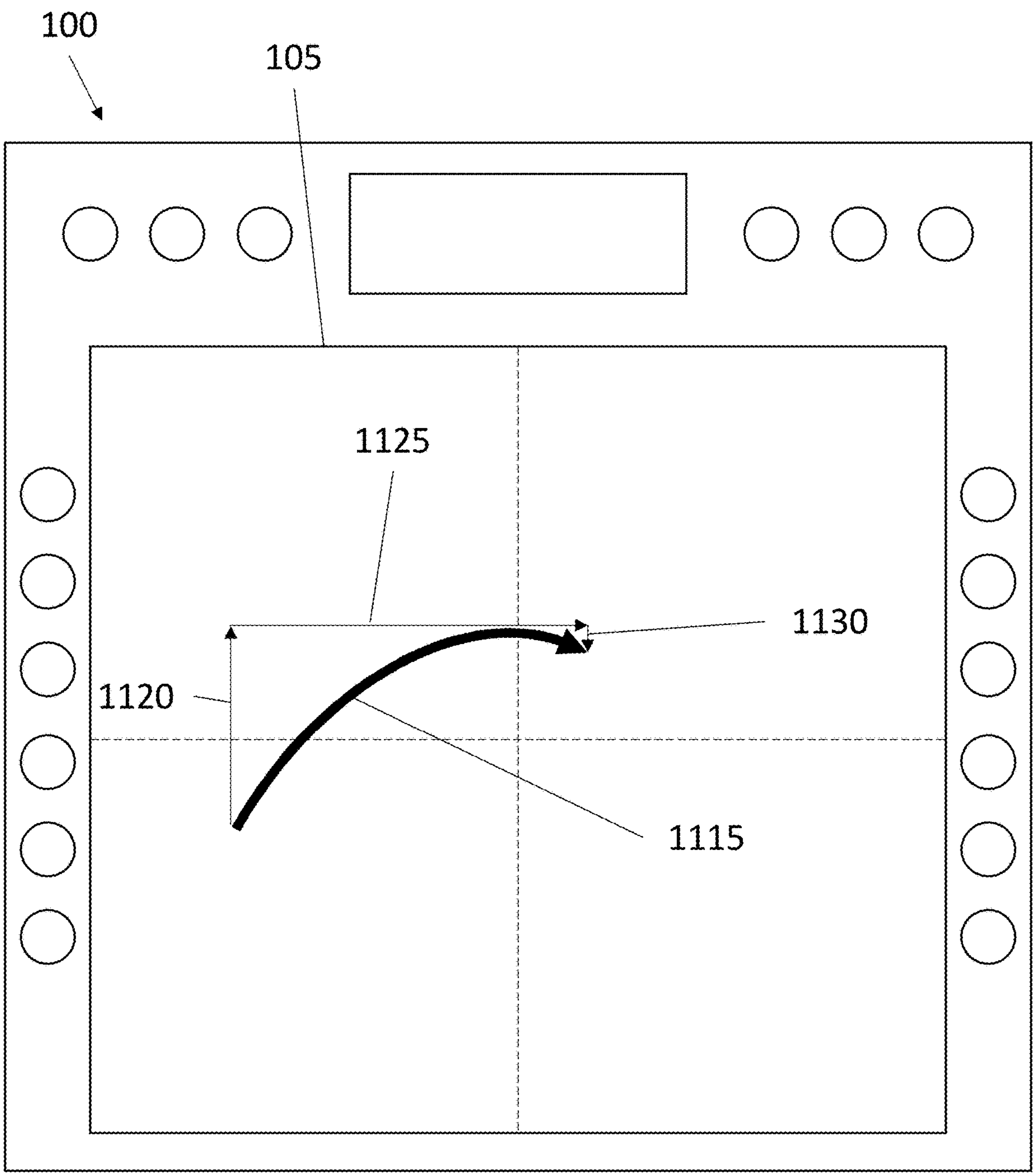
FIG. 11 shows an exemplary depiction of a curved swipe gesture on an arpeggiation controller musical instrument (or arp board) in accordance with aspects of the disclosure.

FIG. 11 shows an exemplary depiction of a curved swipe gesture on an arpeggiation controller musical instrument (or arp board) 100 in accordance with aspects of the disclosure. As shown in FIG. 11, a user may use a curving hand gesture 1115 to, for example, create an arpeggiation pattern while simultaneously, altering one or more parameters of the arpeggiation pattern through the arpeggiation pattern. That is, curves can be created combining horizontal aspects 1125 and vertical aspects 1120, 1130 in a single curving hand gesture 1115. (As should be understood, the horizontal aspects 1125 and vertical aspects 1120 and 1130, which are depicted finer lines, are not themselves hand gestures.) The arpeggiation controller musical instrument 100 is operable to interpolate the dynamically changing horizontal aspects 1125 and vertical aspects 1120, 1130 of the curving hand gesture 1115 into appropriate Arpeggiated Patterns, as described above. That is, for example, with the exemplary curving hand gesture 1115, the arpeggiation controller musical instrument 100 produces an ascending and then descending arpeggio (based on the upward vertical aspect 1120 and the downward vertical aspect 1130), while varying a selected parameter (e.g. length of note) along the ascending and then descending arpeggio (in correspondence with the horizontal aspects 1125). In such a manner, in accordance with aspects of the disclosure, a user can easily create and adjust complex arpeggiation patterns, for example, in real-time.

Figure 12:
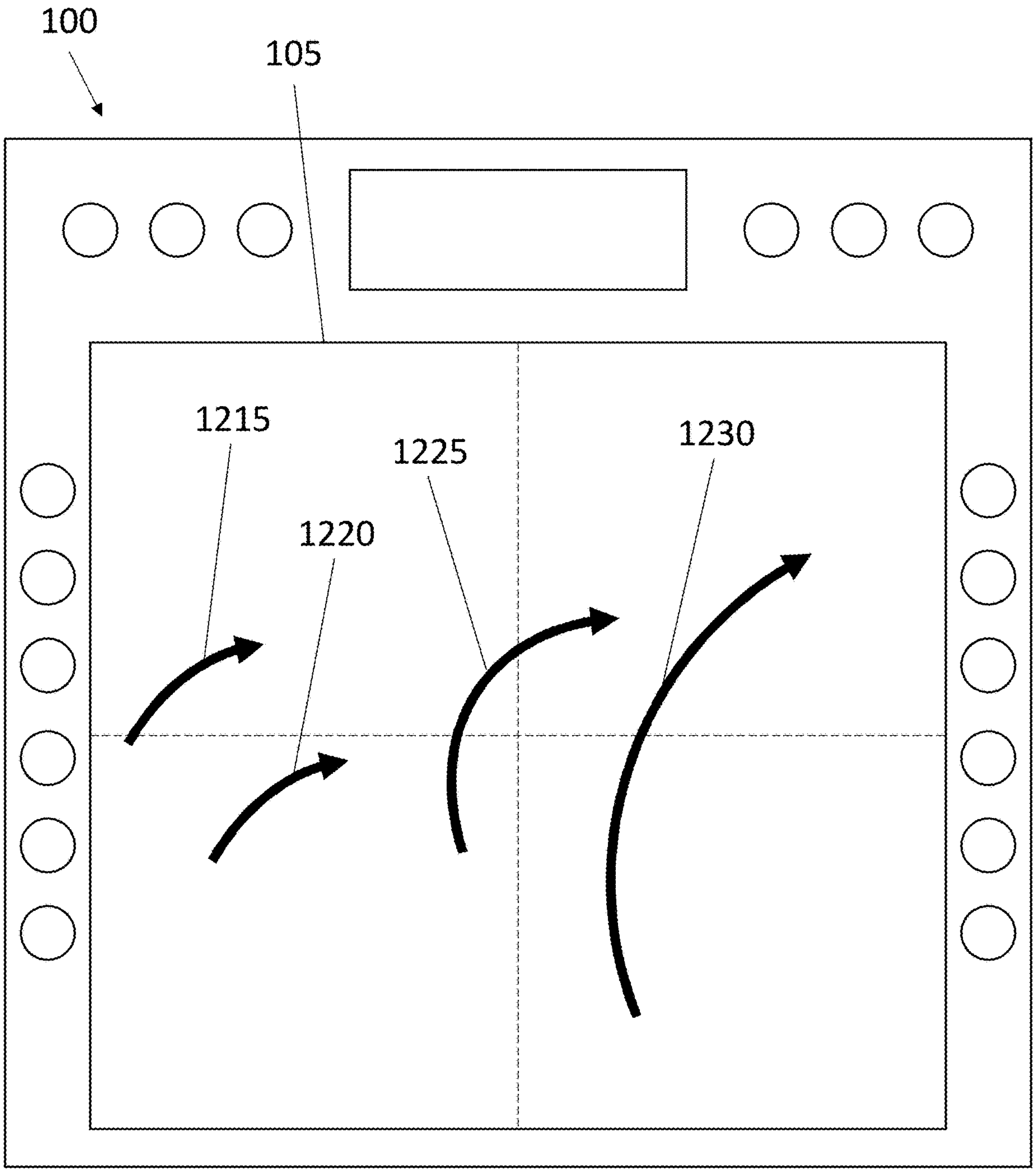
FIG. 12 shows an exemplary depiction of various curved swipe gestures on an arpeggiation controller musical instrument (or arp board) in accordance with aspects of the disclosure.

FIG. 12 shows an exemplary depiction of various curved swipe gestures 1215, 1220, 1225, and 1230 on an arpeggiation controller musical instrument (or arp board) 100 in accordance with aspects of the disclosure. As shown in FIG. 12, a user may use curving hand gestures to, for example, create an arpeggiation pattern while simultaneously, altering one or more parameters of the arpeggiation pattern through the duration of the arpeggiation pattern. That is, as explained above, a user can create finger gesture curves combining horizontal and vertical aspects, which are interpolated into appropriate Arpeggiated Patterns. In embodiments, the staring point, ending point, length, and curvature of the curving hand gesture (e.g., gestures 1215, 1220, 1225, and 1230) are all taken into account to create the arpeggiation pattern. In such a manner, in accordance with aspects of the disclosure, a user can easily create and adjust complex arpeggiation patterns, for example, in real-time.

Figure 13:
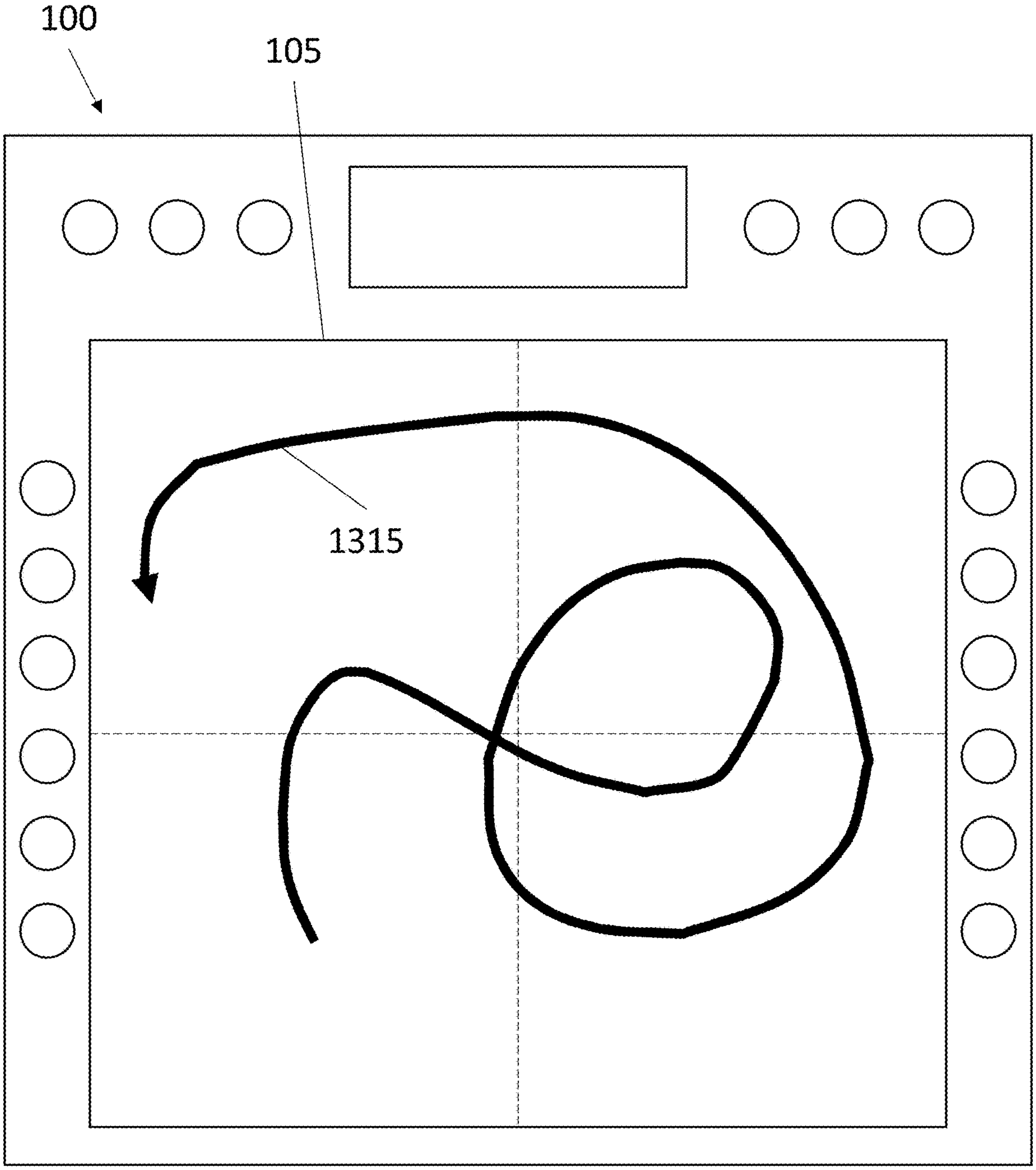
FIG. 13 shows an exemplary depiction of a random curved swipe gesture on an arpeggiation controller musical instrument (or arp board) in accordance with aspects of the disclosure.

FIG. 13 shows an exemplary depiction of a "random" curved swipe gesture 1315 on an arpeggiation controller musical instrument (or arp board) 100 in accordance with aspects of the disclosure. As shown in FIG. 13, using these building blocks discussed above, complex Arpeggiated Patterns can be created that were never before possible using existing tools or that may have been possible, but required hours of tedious labor in traditional step sequencer-based pattern tools. In such a manner, in accordance with aspects of the disclosure, a user can easily create and adjust complex arpeggiation patterns, for example, in real-time.

Figure 14:
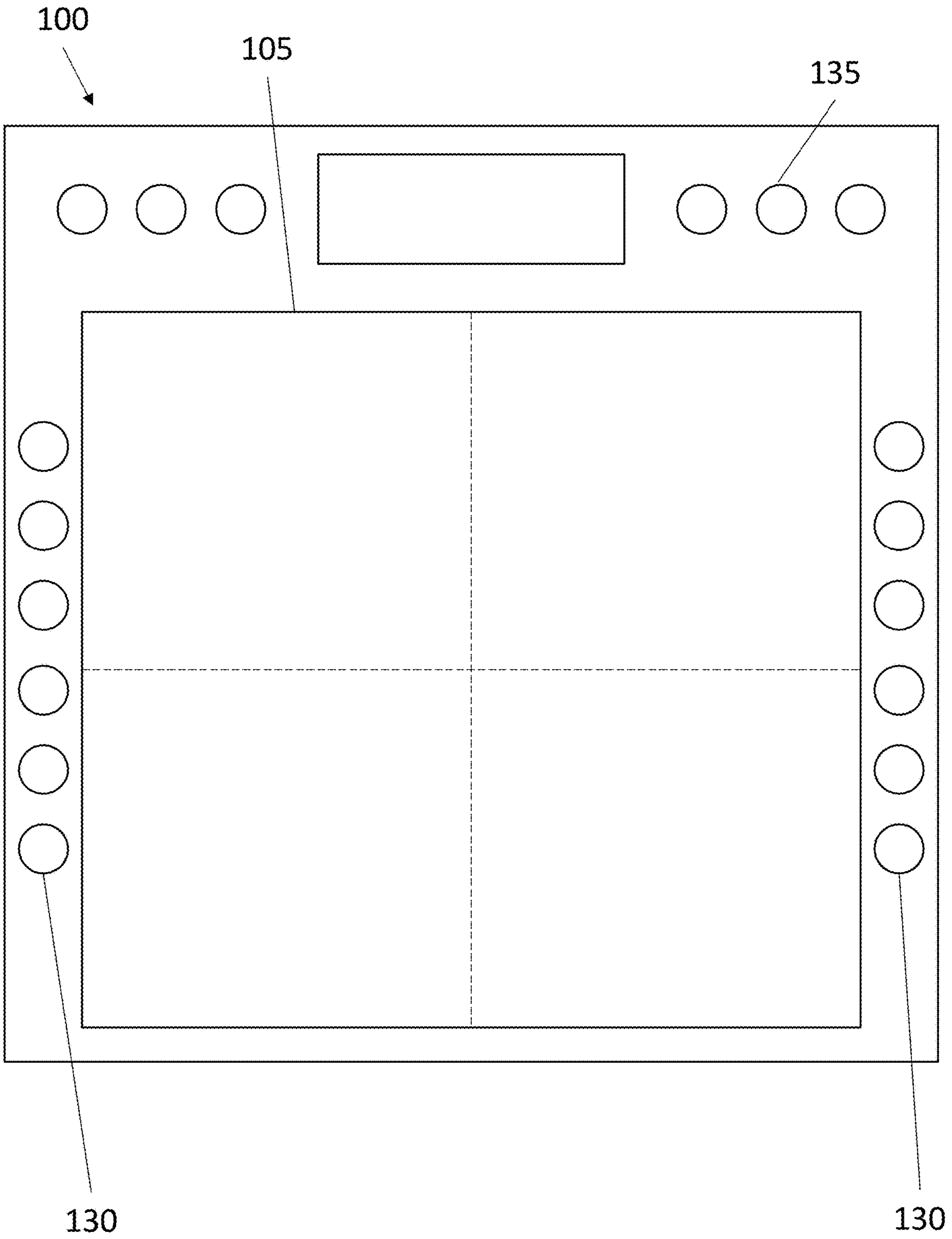
FIG. 14 details features of the encoders of the arpeggiation controller musical instrument (or arp board) in accordance with aspects of the disclosure.

FIG. 14 details features of the encoders of the arpeggiation controller musical instrument (or arp board) 100 in accordance with aspects of the disclosure. As shown in FIG. 14, encoders 130, 135 (or other interface components, such as, potentiometers) arranged around the perimeter of the arpeggiation controller 100 provide for adjustment or tweaking of various Parameters associated with the created Arpeggiated Pattern. Examples of these parameters include, for example, a number of steps, sync quantization, order algorithm, transposition, introduction of randomness, sequencing of arpeggiated patterns, velocity, note substitution, key substation, key imposition, gate time, swing, midi channel, LFO parameter modulation, filter, effects, ADSR envelope modification, reverse, note repeat, polyphony, jumps, predefined pattern overlay, voicing, range, timing, cycles, division, pace, delay, rotation, harmony, tempo, probability, automation, and latching, etc.

Figure 15:
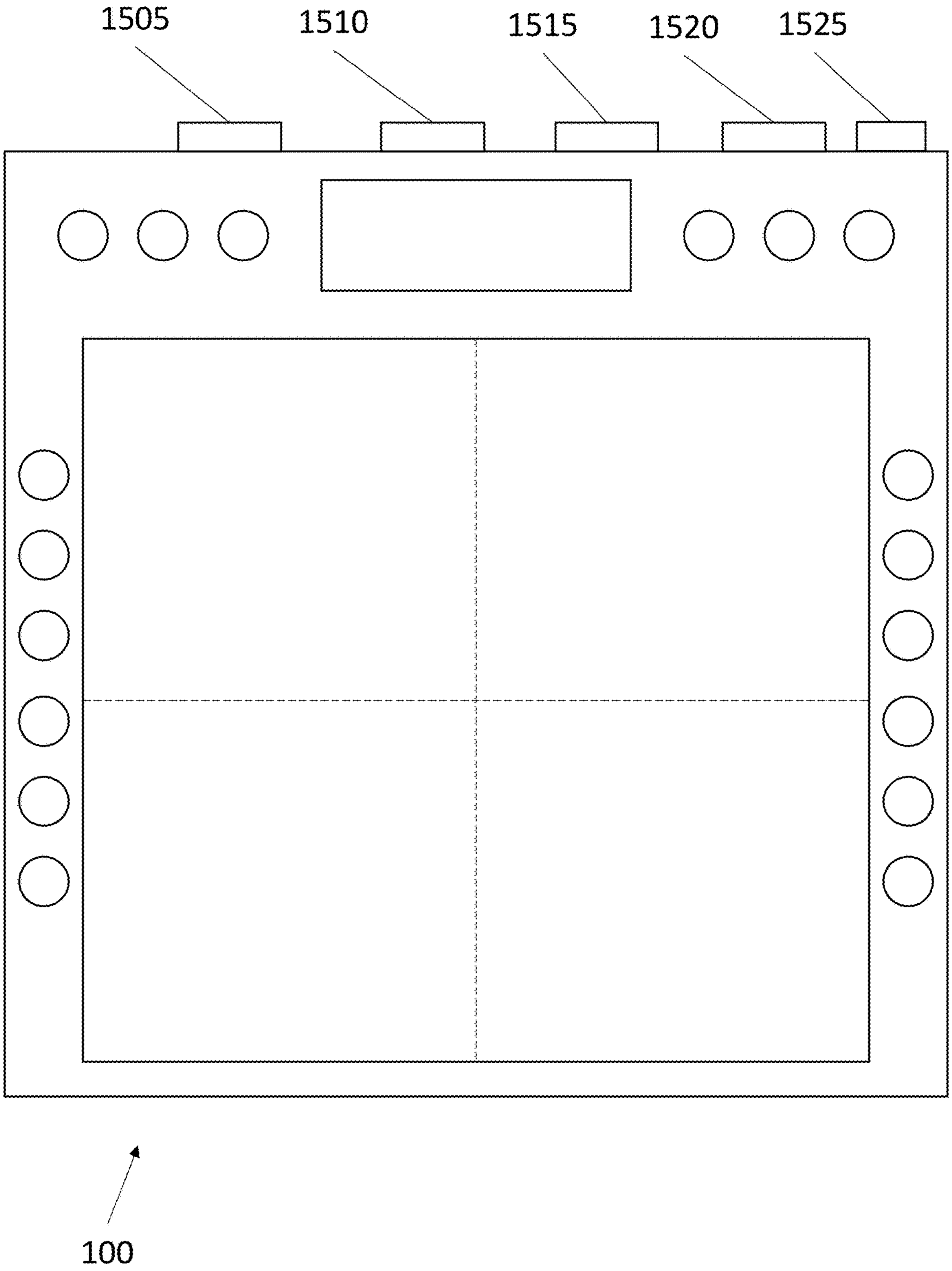
FIG. 15 details features of the connections of the arpeggiation controller musical instrument (or arp board) in accordance with aspects of the disclosure.

FIG. 15 details features of the connections of the arpeggiation controller musical instrument (or arp board) in accordance with aspects of the disclosure. As shown in FIG. 15, the arpeggiation controller may include connections including a USB connection 1505, a MIDI 5-Pin DIN connection 1510, a Bluetooth connection 1515, or other communication technology connection 1520. The arpeggiation controller 100 may also include a power and volume (mute) control section 1525 (including a power switch and, in embodiments, a mute switch). Additionally, while not necessarily shown, it should be understood that the arpeggiation controller has suitable jacks and connections, for example, on a rear side thereof. For example, the arpeggiation controller may include a headphone jack (e.g., ¼" or 3.5 mm), one or more expression pedal jacks, MIDI in, MIDI Thru, and MIDI out jacks 1510, a power jack (e.g., USB power jack or AC power jack), CV connectors, a line out, and/or an audio out. While the arpeggiation controller 100 may be connected to AC power with the power jack, the disclosure contemplates that the arpeggiation controller may be powered with a battery (e.g., DC power) or by USB. As such, the arpeggiation controller 100 may have a suitable battery compartment for accommodating one or more batteries. Control Voltage (or CV) is a DC electrical signal used to manipulate the values of components in analog circuits. Control voltages are used in numerous ways in many different types of electronic circuits for all sorts of purposes and may be used to control electronic musical equipment.

System Environment

Aspects of embodiments of the present disclosure (e.g., an arpeggiation controller) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc. In contemplated embodiments, the control systems may be embedded in the arpeggiation controller to make it stand alone. In contemplated embodiments, the arpeggiation controller and control system may be virtually implemented on a touch screen.

As will be appreciated by one skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, microcode, touch screen, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, touch screen, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a usb key, Bluetooth, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the “C” programming language or similar programming languages. The program code may execute entirely on the user’s computer, partly on the user’s computer, as a stand-alone software package, partly on the user’s computer and partly on a remote computer, entirely embedded within the beat player, or entirely on the remote computer or server. In the latter scenario, the remote computer may be connected to the user’s computer through any type of network. This may include, for example, a local area network (LAN) or a wide area network (WAN), or the connection may be made to an external computer (for example, through the Internet using an Internet Service Provider). Additionally, in embodiments, the present disclosure may be embodied in a field programmable gate array (FPGA).

Figure 16:
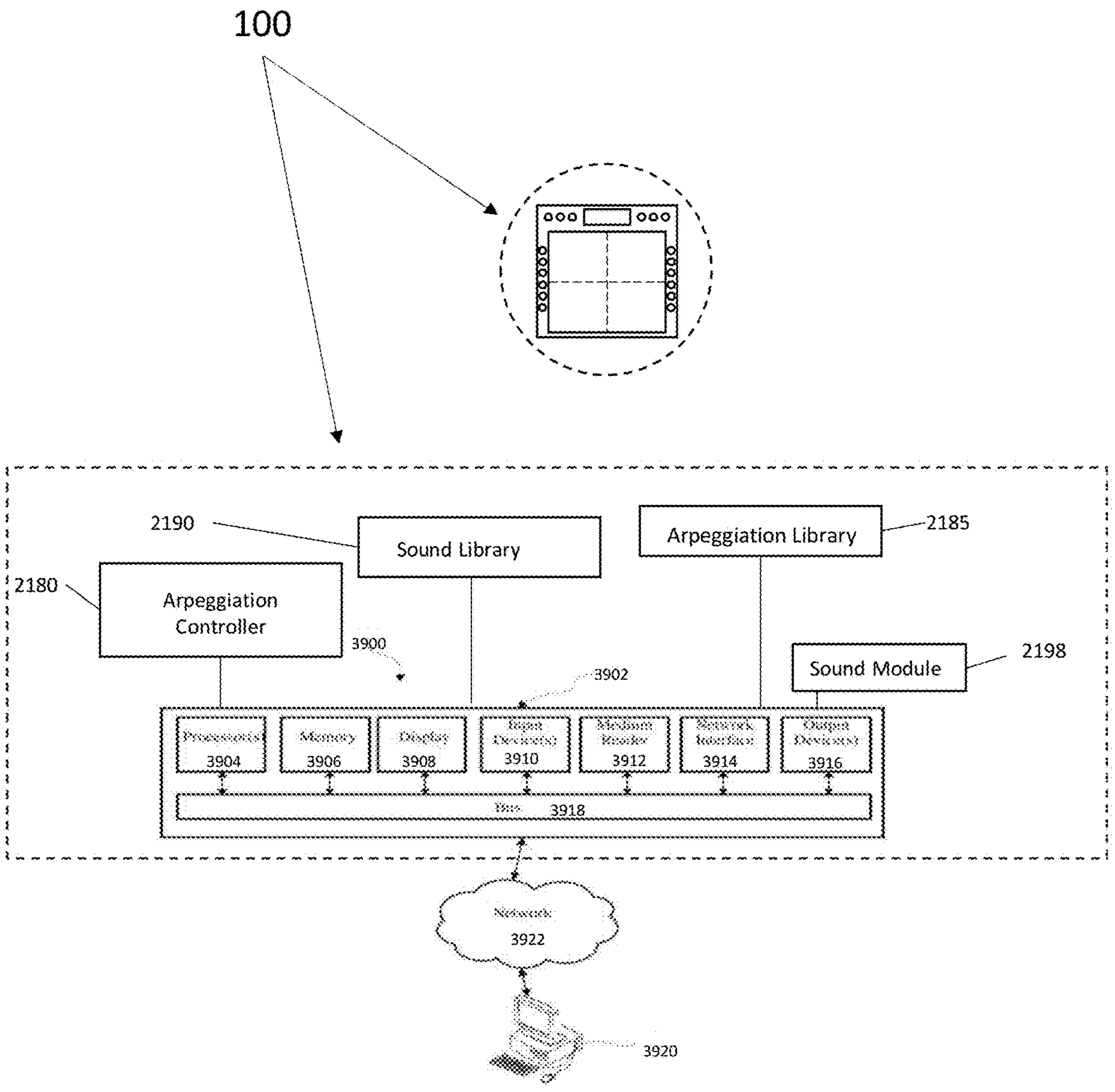
FIG. 16 shows an exemplary environment for practicing aspects of the present disclosure.

FIG. 16 shows an exemplary environment for practicing aspects of the present disclosure. For example, FIG. 16 shows an exemplary system 3900 for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks, cloud environment or embedded within the arpeggiation controller.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 16, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 16, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914 connected via a bus 3918. The computer system 3902 may connect to another computer system 3920 via a network 3922. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof. As shown in FIG. 16, the system 3900 may include an arpeggiation controller 2180 operable to control an arpeggiation player musical instrument (e.g., using a touch screen of a tablet) in accordance with the present disclosure, an arpeggiation library 2185, a sound library 2190, and a sound module 2198.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 16. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols (e.g., MIDI, pads), the disclosure is not limited to such standards and protocols. Such standards are periodically superseded by faster or more efficient equivalents having essentially the same functions. Accordingly, replacement standards and protocols having the same or similar functions are considered equivalents thereof.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

While the specification describes particular embodiments of the present disclosure, those of ordinary skill can devise variations of the present disclosure without departing from the inventive concept.

One or more embodiments of the disclosure may be referred to herein, individually and/or collectively, by the term "invention" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

What is claimed is:

1. An arpeggiation controller musical instrument operable to receive one or more input chords, to detect a user hand gesture to establish an arpeggiation pattern, and to play an arpeggiation of the one or more received input chords in accordance with the arpeggiation pattern, the musical instrument comprising:

an X-Y pad operable to detect the user hand gesture, wherein the user hand gesture sets one or more parameters of the arpeggiation pattern to establish the arpeggiation pattern; and an arpeggiation generator operable to create the arpeggiation of the one or more input chords in accordance with the arpeggiation pattern based on the user hand gesture, wherein the arpeggiation controller musical instrument continues to arpeggiate received input chords in accordance with the arpeggiation pattern until a new user hand gesture on the X-Y pad establishes an updated arpeggiation pattern for the received input chords, upon which the arpeggiation controller musical instrument arpeggiates received input chords in accordance with the updated arpeggiation pattern.

2. The arpeggiation controller musical instrument according to claim 1, wherein the X-Y pad comprises at least one of one or more MIDI polyphonic expression (MPE) controllers, a surface comprising a touch point, a finger-actuatable continuous controller touch point, an optical diode, a plurality of continuous touch sensitive strips, and a mini-touch screen display.

3. The arpeggiation controller musical instrument according to claim 1, wherein the X-Y pad comprises a vertical center line and a horizontal center line defining left and right regions of the X-Y pad and upper and lower regions of the X-Y pad, respectively, and defining four quadrants of the X-Y pad.

4. The arpeggiation controller musical instrument according to claim 1, wherein an upward swipe on the X-Y pad produces an ascending arpeggiation pattern.

5. The arpeggiation controller musical instrument according to claim 1, wherein a downward swipe on the X-Y pad produces a descending arpeggiation pattern.

6. The arpeggiation controller musical instrument according to claim 1, wherein after performing a swipe gesture, continuing to depress or maintain contact with the X-Y pad at an end point of swipe gesture causes the arpeggiation controller musical instrument to repeat the arpeggiation pattern.

7. The arpeggiation controller musical instrument according to claim 6, wherein the arpeggiation controller musical instrument repeats the arpeggiation pattern until contact with the X-Y pad is released.

8. The arpeggiation controller musical instrument according to claim 6, wherein the arpeggiation controller musical instrument repeats the arpeggiation pattern for a configurable number of repeats.

9. The arpeggiation controller musical instrument according to claim 1, wherein an upward-downward swipe on the X-Y pad produces an ascending-then-descending arpeggiation pattern.

10. The arpeggiation controller musical instrument according to claim 1, wherein an upward-downward-upward swipe on the X-Y pad produces an ascending-then-descending-then-ascending arpeggiation pattern.

11. The arpeggiation controller musical instrument according to claim 1, wherein an upward-downward-downward-upward swipe on the X-Y pad produces an ascending-then-descending-then-descending-then-ascending arpeggiation pattern.

12. The arpeggiation controller musical instrument according to claim 1, wherein a rate of an upward-downward swipe on the X-Y pad determines a speed of the arpeggiation pattern.

13. The arpeggiation controller musical instrument according to claim 1, wherein a rightward-leftward swipe of the X-Y pad adjusts one or more parameters for the arpeggiation pattern.

14. The arpeggiation controller musical instrument according to claim 1, wherein a beginning point of an upward-downward swipe on the X-Y pad determines a starting note of the arpeggiation pattern.

15. The arpeggiation controller musical instrument according to claim 1, wherein an ending point of an upward-downward swipe on the X-Y pad determines an ending note of the arpeggiation pattern.

16. The arpeggiation controller musical instrument according to claim 1, wherein a curved swipe on the X-Y pad establishes the parameters of the arpeggiation pattern based on both vertical aspects of the curved swipe and horizontal aspects of the curved swipe.

17. The arpeggiation controller musical instrument according to claim 1, wherein the parameters for the arpeggiation pattern include at least one of: probability of specific notes sounding; velocity variations; length of notes; gate variation; legato; and staccato.

18. The arpeggiation controller musical instrument according to claim 1, further comprising one or more encoders for varying one or more parameters of the arpeggiation controller musical instrument.

19. The arpeggiation controller musical instrument according to claim 18, wherein the one or more parameters of the arpeggiation controller musical instrument include at least one of: a number of steps; sync quantization; order algorithm; transposition; introduction of randomness; sequencing of arpeggiated patterns; velocity; note substitution; key substation; key imposition; gate time; swing; MIDI channel; LFO parameter modulation; filter; effects; ADSR envelope modification; reverse; note repeat; polyphony; jumps; pre-defined pattern overlay; voicing; range; timing; cycles; division; pace; delay; rotation; harmony; tempo; probability; automation; and latching.

20. The arpeggiation controller musical instrument according to claim 1, wherein a length of an upward-downward swipe on the X-Y pad determines a number of octaves in the arpeggiation pattern.

21. An arpeggiation controller musical instrument operable to receive a user hand gesture and play an arpeggiation pattern, the musical instrument comprising:

an X-Y pad operable to detect the user hand gesture, wherein the user hand gesture sets one or more parameters of the arpeggiation pattern; and an arpeggiation generator operable to create the arpeggiation pattern based on the user hand gesture, wherein a length of an upward-downward swipe on the X-Y pad determines a number of octaves in the arpeggiation pattern, with a short swipe producing a one octave arpeggiation, a longer swipe producing a two octave arpeggiation, and a yet longer swipe producing a three octave arpeggiation.

22. An arpeggiation controller musical instrument operable to receive a user hand gesture and play an arpeggiation pattern, the musical instrument comprising:

an X-Y pad operable to detect the user hand gesture, wherein the user hand gesture sets one or more parameters of the arpeggiation pattern; and an arpeggiation generator operable to create the arpeggiation pattern based on the user hand gesture, wherein an upward-downward swipe on the X-Y pad crossing a horizontal center line of the X-Y pad adds ½ octaves or one or more octaves above and below a single-octave arpeggiation dependent upon a vertical length of the upward-downward swipe.

23. A method of creating an arpeggiation pattern using an arpeggiation controller musical instrument, the method comprising:

receiving a user hand gesture on an X-Y pad of the arpeggiation controller musical instrument having a computer processer, the X-Y pad being operable to detect the user hand gesture, wherein the user hand gesture sets one or more parameters of the arpeggiation pattern using the computer processor; and playing the arpeggiation pattern using the computer processor based on the user hand gesture, wherein a length of an upward-downward swipe on the X-Y pad determines a number of octaves in the arpeggiation pattern, with a short swipe producing a one octave arpeggiation, a longer swipe producing a two octave arpeggiation, and a yet longer swipe producing a three octave arpeggiation.

* * * * *